(12) United States Patent
Hunt et al.

(10) Patent No.: US 9,195,934 B1
(45) Date of Patent: Nov. 24, 2015

(54) SPIKING NEURON CLASSIFIER APPARATUS AND METHODS USING CONDITIONALLY INDEPENDENT SUBSETS

(71) Applicant: BRAIN Corporation, San Diego, CA (US)

(72) Inventors: Jonathan James Hunt, San Diego, CA (US); Oleg Sinyavskiy, San Diego, CA (US)

(73) Assignee: Brain Corporation, San Diego, CA (US)

( * ) Notice: Subject to any disclaimer, the term of this patent is extended or adjusted under 35 U.S.C. 154(b) by 308 days.

(21) Appl. No.: 13/756,372

(22) Filed: Jan. 31, 2013

(51) Int. Cl.
*G06N 3/02* (2006.01)
(52) U.S. Cl.
CPC .................................... *G06N 3/02* (2013.01)
(58) Field of Classification Search
None
See application file for complete search history.

(56) References Cited

U.S. PATENT DOCUMENTS

| | | | |
|---|---|---|---|
| 5,063,603 A | 11/1991 | Burt | |
| 5,092,343 A | 3/1992 | Spitzer | |
| 5,245,672 A | 9/1993 | Wilson | |
| 5,355,435 A | 10/1994 | DeYong | |
| 5,388,186 A | 2/1995 | Bose | |
| 5,408,588 A | 4/1995 | Ulug | |
| 5,467,428 A | 11/1995 | Ulug | |
| 5,638,359 A | 6/1997 | Peltola | |
| 5,673,367 A | 9/1997 | Buckley | |
| 5,875,108 A | 2/1999 | Hoffberg | |
| 6,009,418 A | 12/1999 | Cooper | |
| 6,014,653 A | 1/2000 | Thaler | |
| 6,169,981 B1 | 1/2001 | Werbos | |
| 6,363,369 B1 | 3/2002 | Liaw | |
| 6,458,157 B1 | 10/2002 | Suaning | |
| 6,532,454 B1 | 3/2003 | Werbos | |
| 6,545,705 B1 | 4/2003 | Sigel | |
| 6,545,708 B1 | 4/2003 | Tamayama | |
| 6,546,291 B2 | 4/2003 | Merfeld | |
| 6,581,046 B1 | 6/2003 | Ahissar | |
| 6,601,049 B1 | 7/2003 | Cooper | |

(Continued)

FOREIGN PATENT DOCUMENTS

| CN | 102226740 A | 10/2011 |
|---|---|---|
| EP | 1089436 A2 | 4/2001 |

(Continued)

OTHER PUBLICATIONS

Masquelier, Timothee, and Simon J. Thorpe. "Unsupervised learning of visual features through spike timing dependent plasticity." PLoS computational biology 3.2 (2007): e31.*

(Continued)

*Primary Examiner* — Kakali Chaki
*Assistant Examiner* — Kevin W Figueroa
(74) *Attorney, Agent, or Firm* — Gazdzinski & Associates, PC

(57) ABSTRACT

Spiking neuron network conditionally independent subset classifier apparatus and methods. In some implementations, the network may comprise one or more subset neuron layers configured to determine presence of one or more features in the subset of plurality of conditionally independent features. The output of the subset layer may be coupled to an aggregation layer. State of the subset layer may be configured during training based on training input and a reference signal. During operation, spiking output of the subset layer may be combined by the aggregation layer to produce classifier output. Subset layer output and/or classifier output may be encoded using spike rate, latency, and/or base-n encoding.

20 Claims, 16 Drawing Sheets

(56) References Cited

U.S. PATENT DOCUMENTS

| | | |
|---|---|---|
| 6,643,627 B2 | 11/2003 | Liaw |
| 6,917,925 B2 | 7/2005 | Berenji et al. |
| 7,395,251 B2 | 7/2008 | Linsker |
| 7,426,501 B2 | 9/2008 | Nugent |
| 7,672,920 B2 | 3/2010 | Ito |
| 7,752,544 B2 | 7/2010 | Cheng |
| 7,849,030 B2 | 12/2010 | Ellingsworth |
| 8,015,130 B2 | 9/2011 | Matsugu |
| 8,103,602 B2 | 1/2012 | Izhikevich |
| 8,315,305 B2 | 11/2012 | Petre |
| 8,467,623 B2 | 6/2013 | Izhikevich |
| 8,655,815 B2 | 2/2014 | Palmer |
| 8,751,042 B2 | 6/2014 | Lee |
| 2002/0038294 A1 | 3/2002 | Matsugu |
| 2003/0050903 A1 | 3/2003 | Liaw |
| 2004/0193670 A1 | 9/2004 | Langan |
| 2005/0015351 A1 | 1/2005 | Nugent |
| 2005/0036649 A1 | 2/2005 | Yokono |
| 2005/0283450 A1 | 12/2005 | Matsugu |
| 2006/0161218 A1 | 7/2006 | Danilov |
| 2007/0022068 A1 | 1/2007 | Linsker |
| 2007/0176643 A1 | 8/2007 | Nugent |
| 2007/0208678 A1 | 9/2007 | Matsugu |
| 2008/0024345 A1 | 1/2008 | Watson |
| 2008/0162391 A1 | 7/2008 | Izhikevich |
| 2009/0043722 A1 | 2/2009 | Nugent |
| 2009/0287624 A1 | 11/2009 | Rouat |
| 2010/0086171 A1 | 4/2010 | Lapstun |
| 2010/0166320 A1 | 7/2010 | Paquier |
| 2010/0169098 A1 | 7/2010 | Patch |
| 2010/0198765 A1 | 8/2010 | Fiorillo |
| 2011/0016071 A1 | 1/2011 | Guillen |
| 2011/0119214 A1 | 5/2011 | Breitwisch |
| 2011/0119215 A1 | 5/2011 | Elmegreen |
| 2011/0160741 A1 | 6/2011 | Asano |
| 2012/0011090 A1 | 1/2012 | Tang |
| 2012/0011093 A1 | 1/2012 | Aparin |
| 2012/0036099 A1 | 2/2012 | Venkatraman |
| 2012/0109866 A1 | 5/2012 | Modha |
| 2012/0303091 A1 | 11/2012 | Izhikevich |
| 2012/0308076 A1 | 12/2012 | Piekniewski |
| 2012/0308136 A1 | 12/2012 | Izhikevich |
| 2013/0073080 A1 | 3/2013 | Ponulak |
| 2013/0073491 A1 | 3/2013 | Izhikevich |
| 2013/0073493 A1 | 3/2013 | Modha |
| 2013/0073496 A1 | 3/2013 | Szatmary |
| 2013/0073500 A1 | 3/2013 | Szatmary |
| 2013/0151448 A1 | 6/2013 | Ponulak |
| 2013/0151449 A1 | 6/2013 | Ponulak |
| 2013/0151450 A1 | 6/2013 | Ponulak |
| 2013/0204820 A1* | 8/2013 | Hunzinger et al. ............ 706/25 |
| 2013/0218821 A1 | 8/2013 | Szatmary |
| 2013/0251278 A1 | 9/2013 | Izhikevich |
| 2013/0297541 A1 | 11/2013 | Piekniewski |
| 2013/0325766 A1 | 12/2013 | Petre |
| 2013/0325768 A1 | 12/2013 | Sinyavskiy |
| 2013/0325773 A1 | 12/2013 | Sinyavskiy |
| 2013/0325774 A1 | 12/2013 | Sinyavskiy |
| 2013/0325775 A1 | 12/2013 | Sinyavskiy |
| 2013/0325776 A1 | 12/2013 | Ponulak |
| 2013/0325777 A1 | 12/2013 | Petre |
| 2014/0016858 A1 | 1/2014 | Richert |
| 2014/0025613 A1 | 1/2014 | Ponulak |
| 2014/0032458 A1 | 1/2014 | Sinyavskiy |
| 2014/0081895 A1 | 3/2014 | Coenen et al. |
| 2014/0193066 A1 | 7/2014 | Richert |
| 2014/0222739 A1 | 8/2014 | Ponulak |

FOREIGN PATENT DOCUMENTS

| | | |
|---|---|---|
| JP | 4087423 | 3/1992 |
| RU | 2108612 C1 | 10/1998 |
| RU | 2406105 C2 | 12/2010 |
| WO | 2008083335 A2 | 7/2008 |
| WO | 2008132066 A1 | 11/2008 |

OTHER PUBLICATIONS

Hagras, Hani et al., "Evolving Spiking Neural Network Controllers for Autonomous Robots", IEEE 2004.

Masakazu et al, "Convolutional Spiking Neural Network Model for Robust Face Detection", 2002 Proceedings of the 9th International Conference on Neural Information Processing (ICONIP'02), vol. 2.

Jesper Tegner, et al., 2002 "An adaptive spike-timing-dependent plasticity rule" Elsevier Science B.V.

PCT International Search Report for International Application PCT/US2013/060352 dated Jan. 16, 2014.

Bohte, 'Spiking Nueral Networks' Doctorate at the University of Leiden, Holland, Mar. 5, 2003, pp. 1-133 [retrieved on Nov. 14, 2012]. Retrieved from the internet: <URL: http://holnepagcs, cwi ,n11-sbolltedmblica6ond)hdthesislxif>.

Brette et al., Brian: a simple and flexible simulator for spiking neural networks, The Neuromorphic Engineer, Jul. 1, 2009, pp. 1-4, doi: 10.2417/1200906.1659.

Cuntz et al., 'One Rule to Grow Them All: A General Theory of Neuronal Branching and Its Paractical Application' Plos Computational Biology, 6 (8), Published Aug. 5, 2010.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

Fidjeland et al., Accelerated Simulation of Spiking Neural Networks Using GPUs [online],2010 [retrieved on Jun. 15, 2013], Retrieved from the Internet: URL:http://ieeexplore.ieee.org/xpls/abs_all.jsp?ammber=5596678&tag=1.

Floreano et al., 'Neuroevolution: from architectures to learning' Evol. Intel. Jan.[2008 1:47-62, [retrieved Dec. 30, 2013] [retrieved online from URL:<http://inforscience.epfl.ch/record/112676/files/FloreanoDuerrMattiussi2008.p df>.

Gewaltig et al., 'NEST (Neural Simulation Tool)', Scholarpedia, 2007, pp. 1-15, 2(4): 1430, doi: 1 0.4249/scholarpedia.1430.

Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.

Goodman et al., Brian: a simulator for spiking neural networks in Python, Frontiers in Neuroinformatics, Nov. 2008, pp. 1-10, vol. 2, Article 5.

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conf.fninf.2011.08.00098.

Graham, Lyle J., The Surf-Hippo Reference Manual, http:// www. neurophys.biomedicale.univparis5. fr/-graham/surf-hippo-files/Surf-Hippo%20Reference%20Manual.pdf, Mar. 2002, pp. 1-128.

Izhikevich, 'Polychronization: Computation with Spikes', Neural Computation, 25, 2006, 18, 245-282.

Izhikevich, 'Simple Model of Spiking Neurons', IEEE Transactions on Neural Networks, vol. 14, No. 6, Nov. 2003, pp. 1569-1572.

Izhikevich et al., 'Relating STDP to BCM', Neural Computation (2003) 15, 1511-1523.

Karbowski et al., 'Multispikes and Synchronization in a Large Neural Network with Temporal Delays', Neural Computation 12, 1573-1606 (2000).

Khotanzad, 'Classification of invariant image representations using a neural network' IEEF. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf>.

(56) References Cited

OTHER PUBLICATIONS

Laurent, 'The Neural Network Query Language (NNQL) Reference' [retrieved on Nov. 12, 2013]. Retrieved from the Internet: <URL https://code.google.com/p/nnql/issues/detail?id=1>.

Laurent, 'Issue 1—nnql—Refactor Nucleus into its own file—Neural Network Query Language' [retrieved on Nov. 12, 2013]. Retrieved from the Internet: URL:https://code.google.com/p/nnql/issues/detail?id=1.

Nichols, A Re configurable Computing Architecture for Implementing Artificial Neural Networks on FPGA, Masters Thesis, The University of Guelph, 2003, pp. 1-235.

Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu/viewdoc/download?doi=10.1.1.5.4346&rep=rep1&type=pdf.

Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com].

Schemmel et al., Implementing synaptic plasticity in a VLSI spiking neural network model in Proceedings of the 2006 International Joint Conference on Neural Networks (IJCNN'06), IEEE Press (2006) Jul. 16-21, 2006, pp. 1-6 [online], [retrieved on Dec. 10, 2013]. Retrieved from the Internet <URL: http://www.kip.uni-heidelberg.de/veroeffentlichungen/download.egi/4620/ps/1774.pdf>.

Simulink.RTM. model [online], [Retrieved on Dec. 10, 2013] Retrieved from URL: http://www.mathworks.com/ products/simulink/index.html>.

Sinyavskiy et al. 'Reinforcement learning of a spiking neural network in the task of control of an agent in a virtual discrete environment' Rus. J. Nonlin. Dyn., 2011, vol. 7, No. 4 (Mobile Robots), pp. 859-875, chapters 1-8 (Russian Article with English Abstract).

Sjostrom et al., 'Spike-Timing Dependent Plasticity' Scholarpedia, 5(2):1362 (2010), pp. 1-18.

Szatmary et al., 'Spike-timing Theory of Working Memory' PLoS Computational Biology, vol. 6, Issue 8, Aug. 19, 2010 [retrieved on Dec. 30, 2013]. Retrieved from the Internet: <URL: http://www.ploscompbiol.org/article/info%3Adoi%2F10.1371 %2Fjournal.pcbi.10008 79#>.

PCT International Search Report for PCT/US2013/052136 dated Nov. 30, 2013.

Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org>.

Seung, H. "Learning in spiking neural networks by reinforcement of stochastic synaptic transmission." Neuron vol. 40 No. 6 (2003): pp. 1063-1073.

Weber, C. et al. 'Robot docking with neural vision and reinforcement.' Knowledge-Based Systems vol. 17 No. 2 (2004): pp. 165-172.

Baras, D. et al. "Reinforcement learning, spike-time-dependent plasticity, and the BCM rule." Neural Computation vol. 19 No. 8 (2007): pp. 2245-2279.

de Queiroz, M. et al. "Reinforcement learning of a simple control task using the spike response model." Neurocomputing vol. 70 No. 1 (2006): pp. 14-20.

PCT International Search Report and Written Opinion for International Application No. PCT/US2013/044124 dated Sep. 12, 2013.

Bennett (1999), The early history of the synapse: from Plato to Sherrington. Brain Res. Bull., 50(2): 95-118.

Haykin, (1999), Neural Networks: A Comprehensive Foundation (Second Edition), Prentice-Hall.

"In search of the artificial retina" [online], Vision Systems Design, Apr. 1, 2007.

Kenji, (2000), Reinforcement Learning in Continuous Time and Space, Neural Computation, 12:1, 219-245.

Klute et al., (2002). Artificial Muscles: Actuators for Biorobotic Systems. The International Journal 0./ Robotics Research 21 :295-309.

Lendek et al., (2006) State Estimation under Uncertainty: A Survey. Technical report 06-004, Delft Center for Systems and Control Delft University of Technology.

Legenstein et al., (2008), A learning theory for reward-modulated spike timing-dependent plasticity with application to biofeedback. PLoS Computational Biology, 4(10): 1-27.

Nikolic et al., (2011) High-sensitivity silicon retina for robotics and prosthetics.

Ponulak, (2005), ReSuMe—New supervised learning method for Spiking Neural Networks. Technical Report, Institute of Control and Information Engineering, Poznan University of Technology.

Ponulak et al., (2010) Supervised Learning in Spiking Neural Networks with ReSuMe: Sequence Learning, Classification and Spike-Shifting. Neural Comp., 22(2): 467-510.

Sutton et al., (1998), Reinforcement Learning, an Introduction. MIT Press.

Schreiber et al., (2003), A new correlation-based measure of spike timing reliability. Neurocomputing, 52-54, 925-931.

Sutton, (1988). Learning to predict by the methods of temporal differences. Machine Learning 3(1), 9-44.

Stein, (1967). Some models of neural variability. Biophys. J., 7: 37-68.

Werbos, (1992), or Prokhorov D.V and Wunsch D.C. (1997) Adaptive Critic Designs, IEEE Trans Neural Networks, vol. 8, No. 5, pp. 997-1007.

White et al., (Eds.) (1992) Handbook of Intelligent Control: Neural, Fuzzy and Adaptive Approaches. Van Nostrand Reinhold, New York.

Widrow et al., (1960) Adaptive Switching Circuits. IRE WESCON Convention Record 4: 96-104.

Ponulak (2006) Supervised Learning in Spiking Neural Networks with ReSuMe Method. Doctoral Dissertation Poznan, Poland.

Florian (2007) Reinforcement Learning Through Modulation of Spike-Timing-Dependent Synaptic Plasticity, Neural Computation 19, 1468-1502 Massachusetts Institute of Technology.

Morrison, (2008)Phenomenological models of synaptic plasticity based on spike timing, Received: Jan. 16, 2008 / Accepted: Apr. 9, 2008 The Author(s).

Bouganis et al., (2010) "Training a Spiking Neural Network to Control a 4-DoF Robotic Arm based on Spike Timing-Dependent Plasticity", Proceedings of WCCI201 0 IEEE World Congress on Computational Intelligence, CCIB, Barcelona, Spain, Jul. 18-23, 2010, pp. 4104-4111.

Xie et al., (2004) "Learning in neural networks by reinforcement of irregular spiking", Physical Review E, vol. 69, letter 041909, pp. 1-10.

Floreano et al., (2008) Floreano et al. Neuroevolution: From Architectures to learning Evol. Intel. Jan. 2008 1:47-62 (retrieved online on Apr. 24, 2013 from http://infoscience.epfl.ch/record/112676/files/FloreanoDuerrMattiussi2008pdf).

D'Cruz (1998) Reinforcement Learning in Intelligent Control: A Biologically-Inspired Inspired Approach to the Re/earning Problem Brendan May 1998.

Aleksandrov (1968), Stochastic optimization, Engineering Cybernetics, 5, 11-16.

Amari (1998), Why natural gradient?, Acoustics, Speech and Signal Processing, (pp. 1213-1216). Seattle, WA, USA.

Bartlett et al., (2000) "A Biologically Plausible and Locally Optimal Learning Algorithm for Spiking Neurons" Retrieved from http://arp.anu.edu.au/ftp/papers/jon/brains.pdf.gz.

Baxter et al. (2000.). Direct gradient-based reinforcement learning. In Proceedings of the International Symposium on Circuits.

Bohte et al., "A Computational Theory of Spike-Timing Dependent Plasticity: Achieving Robust Neural Responses via Conditional Entropy Minimization" 2004.

Bohte, (2000). SpikeProp: backpropagation for networks of spiking neurons. In Proceedings of ESANN'2000, (pp. 419-424).

Booij (Jun. 2005). A Gradient Descent Rule for Spiking Neurons Emitting Multiple Spikes. Information Processing Letters n. 6, v.95 , 552-558.

Breiman et al., "Random Forests" 33pgs, Jan. 2001.

(56) References Cited

OTHER PUBLICATIONS

Capel, "Random Forests and Ferns" LPAC, Jan. 11, 2012, 40 pgs.
El-Laithy (2011), A reinforcement learning framework for spiking networks with dynamic synapses, Comput Intell Neurosci.
Fletcher (1987), Practical methods of optimization, New York, NY: Wiley-Interscience.
Florian (2005), A reinforcement learning algorithm for spiking neural networks SYNASC '05 Proceedings of the Seventh International Symposium on Symbolic and Numeric Algorithms for Scientific Computing.
Fremaux et al., "Functional Requirements for Reward-Modulated Spike-Timing-Dependent Plasticity", The Journal of Neuroscience, Oct. 6, 2010, 30 (40):13326-13337.
Fu (2005) Stochastic Gradient Estimation, Technical Research Report.
Fu (2008), What You Should Know About Simulation and Derivatives Naval Research Logistics, vol. 55, No. 8, 723-736.
Fyfe et al., (2007), Reinforcement Learning Reward Functions for Unsupervised Learning, ISNN '07 Proceedings of the 4th international symposium on Neural Networks: Advances in Neural Networks.
Gerstner (2002), Spiking neuron models: single neurons, populations, plasticity, Cambridge, U.K.: Cambridge University Press.
Glynn (1995), Likelihood ratio gradient estimation for regenerative stochastic recursions, Advances in Applied Probability, 27, 4, 1019-1053.
Ho, "Random Decision Forests" Int'l Conf. Document Analysis and Recognition, 1995, 5 pgs.
Izhikevich (2007), Solving the distal reward problem through linkage of STDP and dopamine signaling, Cerebral Cortex, vol. 17, pp. 2443-2452.
Kalal et al. "Online learning of robust object detectors during unstable tracking" published on 3rd On-line Learning for Computer Vision Workshop 2009, Kyoto, Japan, IEEE CS.
Kiefer (1952), Stochastic Estimation of the Maximum of a Regression Function, Annals of Mathematical Statistics 23, #3, 462-466.
Klampfl (2009), Spiking neurons can learn to solve information bottleneck problems and extract independent components, Neural Computation, 21(4), pp. 911-959.
Kleijnen et al., Optimization and sensitivity analysis of computer simulation models by the score function method Invited Review European Journal of Operational Research, Mar. 1995.
Larochelle et al., (2009), Exploring Strategies for Training Deep Neural Networks, J. of Machine Learning Research, v. 10, pp. 1-40.
Ojala et al., "Performance Evaluation of Texture Measures with Classification Based on Kullback Discrimination of Distributions" 1994 IEEE, pp. 582-585.
Ozuysal et al., "Fast Keypoint Recognition in Ten Lines of Code" CVPR 2007.
Ozuysal et al., "Fast Keypoint Recognition Using Random Ferns" IEEE Transactions on Pattern Analysis and Machine Intelligence, vol. 32, No. 3, Mar. 2010, pp. 448-461.
Pfister (2003), Optimal Hebbian Learning: A Probabilistic Point of View, In ICANN Proceedings. Springer, pp. 92-98.
Pfister (2006), Optimal Spike-Timing Dependent Plasticity for Precise Action Potential Firing in Supervised Learning, Neural computation ISSN 0899-7667, 18 (6).
Reiman et al. (1989). Sensitivity analysis for simulations via likelihood ratios. Oper Res 37, 830-844.
Robbins (1951), A Stochastic Approximation Method, Annals of Mathematical Statistics 22, #3, 400-407.
Rosenstein et al., (2002), Supervised learning combined with an actor-critic architecture, Technical Report 02-41, Department of Computer Science, University of Massachusetts, Amherst.
Kleijnen et al., "Optimization and sensitivity analysis of computer simulation models by the score function method", Invited Review European Journal of Operational Research, Mar. 1995.
Rumelhart et al., (1986), Learning representations by back-propagating errors, Nature 323 (6088), pp. 533-536.
Rumelhart (1986), Learning internal representations by error propagation, Parallel distributed processing, vol. 1 (pp. 318-362), Cambridge, MA: MIT Press.
Sinyavskiy, et al. "Generalized Stochatic Spiking Neuron Model and Extended Spike Response Model in Spatial-Temporal Impulse Pattern Detection Task", Optical Memory and Neural Networks (Information Optics), 2010, vol. 19, No. 4, pp. 300-309, 2010.
Tishby et al., (1999), The information bottleneck method, In Proceedings of the 37th Annual Allerton Conference on Communication, Control and Computing, B Hajek & RS Sreenivas, eds., pp. 368-377, University of Illinois.
Toyoizumi (2007), Optimality Model of Unsupervised Spike-Timing Dependent Plasticity: Synaptic Memory and Weight Distribution, Neural Computatuon, 19 (3).
Toyoizumi et al., (2005), Generalized Bienenstock-Cooper-Munro rule for spiking neurons that maximizes information transmission, Proc. Natl. Acad. Sci. USA, 102, (pp. 5239-5244).
Vasilaki et al., "Spike-Based Reinforcement Learning in Continuous State and Action Space: When Policy Gradient Methods Fail" PLoS, vol. 5, Issue 12, Dec. 2009.
Vasilaki, et al., "Learning flexible sensori-motor mappings in a complex network" Biol Cybern (2009) 100:147-158.
Weaver (2001), The Optimal Reward Baseline for Gradient-Based Reinforcement Learning, UAI 01 Proceedings of the 17th Conference in Uncertainty in Artificial Intelligence (pp. 538-545). Morgan Kaufman Publishers.
Weber et al., (2009), Goal-Directed Feature Learning, In: Proc, International Joint Conference on Neural Networks, 3319-3326.
Williams (1992), Simple Statistical Gradient-Following Algorithms for Connectionist Reinforcement Learning, Machine Learning 8, 229-256.
Yi (2009), Stochastic search using the natural gradient, ICML '09 Proceedings of the 26th Annual International Conference on Machine Learning. New York, NY, USA.
Bertsekas, Dimitri P., "Approximate dynamic programming." (2011).
Bertsekas, Dimitri P., and Dimitri P. Bertsekas. Dynamic programming and optimal control. vol. 1. No. 2. Belmont, MA: Athena Scientific, 1995.
Govindi Iasamy, James J., Sean F. McLoone, and George W. Irwin, "Sequential learning for adaptive critic design: An industrial control application," Machine Learning for Signal Processing, 2005 IEEE Workshop on. IEEE, 2005.
Hanselmann, Thomas, Lyle Noakes, and Anthony Zaknich, "Continuous-time adaptive critics," Neural Networks, IEEE Transactions on 18.3 (2007): 631-647.
Kaelbling, Leslie Pack, Michael L. Littman, and Andrew W. Moore, "Reinforcement learning: A survey." arXiv preprint cs/96051 03 (1996).
Lin, Long-Ji, "Self-improving reactive agents based on reinforcernent learning, planning and teaching," Machine learning 8.3-4 (1992): 293-321.
PCT International Search Report for International Application PCT/US2013/026738 dated Jul. 21, 2014 (10 pgs).
Pearson. John C., Clay D. Spence and Ronald Sverdlove, "Applications of Neural Networks in Video Signal Processing", Part of Advances in Neural Information Processing Systems 3 (NIPS 1990), 1990, pp. 289-295.
Ponulak, "Analysis of the Resume learning Process for Spiking Neural Networks," International Journal of Applied Mathematics & Computer Science: Jun. 2008, vol. 18, Issue 2, pp. 117-127.
Prokiiorov, Danil V., and Lee A. Feldkamp, "Primitive adaptive critics." Neural Networks, 1997, International Conference on vol. 4. IEEE, 1997.
Schrauwen et al., "Improving SpikeProp: Enhancements to an Error-Backpropagation Rule for Spiking Neural Networks", ProsRISC workshop, 2004, pp. 301-305.
Sherrington , (1897); The Central Nervous System. A Textbook of Physiology, 7th ed., part III, Ed. by Foster M. Macmillian and Co. Ltd.. London, p. 929.
Sinyavskiy O. Yu.: 'Obuchenic s podkrepleniem spaikovoy neiroiniy seti v zadache upravleniya agentom v diskretnoy virtualnoy srede.' Nelineinaya Dinamika vol. T. 7., No. 24, 2011, pp. 859-875.

(56) References Cited

OTHER PUBLICATIONS

Swinehart, Christian D. and L. F. Abbott, "Dimensional Reduction for Reward-based Learning", Network: Computation in Neural Systems, col. 17(3), Sep. 2006, pp. 235-252.

Wang, R. et al., A programmable axonal propagation delay circuit for time-delay spiking neural networks. Circuits and System (ISCAS), 2011 IEEE International Symposium on. May 15-18, 2011, pp. 869-872 [retrieved on Nov. 13, 2013]. [retrieved from ieeexplore.ieee.org].

Widrow, Bernard, Narendra K. Gupta, and Sidhartha Maitra, "Punish/reward: Learning with a critic in adaptive threshold Systems." Systems, Man and Cybernetics, IEEE Transactions on 5 (1973): 455-465.

* cited by examiner

SPIKING NEURON CLASSIFIER APPARATUS AND METHODS USING CONDITIONALLY INDEPENDENT SUBSETS

CROSS-REFERENCE TO RELATED APPLICATIONS

This application is related to co-owned and co-pending U.S. patent application Ser. No. 13/756,382, filed Jan. 31, 2013 and entitled "REDUCED LATENCY SPIKING NEURON CLASSIFIER APPARATUS AND METHODS", the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates to parameter estimation, object classification, data regression, detection, and feature detection using spiking neuron networks.

2. Background

Statistical methods may be used for classification and/or detection applications. One such method, a type of Bayes classifier with conditionally independent feature subsets (also referred as "ferns") may utilize multiple sub-classifiers. Individual sub-classifiers may be used to classify subsets of a total feature set $f_n$.

A classifier with conditionally independent subsets may make a direct tradeoff between the complexity of full Bayes classifier and the tractability of independent Bayes classifier.

Artificial spiking neural networks may be used in signal processing and/or for solving artificial intelligence problems. Such networks may employ a pulse-coded mechanism. The pulse-coded mechanism may encode information using the timing of the pulses (e.g., temporal pulse latency). Such pulses (also referred to as "spikes" or 'impulses') may be described as short-lasting (e.g., on the order of 1-2 ms) discrete temporal events. Several exemplary implementations of such encoding are described in commonly owned and co-pending U.S. patent application Ser. No. 13/152,084 entitled APPARATUS AND METHODS FOR PULSE-CODE INVARIANT OBJECT RECOGNITION", filed Jun. 2, 2011 and co-owned U.S. patent application Ser. No. 13/152,119, filed Jun. 2, 2011, entitled "SENSORY INPUT PROCESSING APPARATUS AND METHODS", and patented as U.S. Pat. No. 8,942,466 on Jan. 27, 2015, each of the foregoing being incorporated herein by reference in its entirety. Spiking neuron networks may be used to convert visual sensory input into spiking output for further processing.

SUMMARY

One aspect of the disclosure relates to a computer-implemented method for detecting an object in a digital image. The method may be performed by one or more processors configured to execute computer program modules. The method may comprise: receiving a spiking input comprising a vector of features representing the object; inverting the spiking input to produce an inverted spiking signal; selecting subsets of the vector of features including a first subset, the first subset including one or more of the vector of features; providing a portion of the spiking input and a portion of the inverted signal to a first sub-classifier of a plurality of sub-classifiers, the portion of the spiking input and the portion of the inverted signal being associated with the first subset, the first sub-classifier comprising a plurality of spiking neurons; based on the provided portion of the spiking input and the provided portion of the inverted spiking signal, providing a first sub-classification output by the first sub-classifier; and combining outputs of individual ones of the plurality of sub-classifiers associated with respective ones of the subsets of the vector of features to provide a classification output, the classification output being configured to indicate a presence or an absence of the object in the image.

In some implementations, the method may comprise updating states of individual ones of the plurality of neurons based on at least one feature present within the provided portion of the spiking input and the provided portion of the inverted spiking signal. The first sub-classification output may be provided based on the updated states.

In some implementation, the first sub-classification output may be characterized by one or more spikes generated by one or more neurons of the plurality of neurons. The spike may be configured to indicate a presence or an absence of the object in the first subset of the vector of features.

In some implementations, the first sub-classification output may be characterized by a singular spike provided by an individual one of the plurality of neurons. The singular spike may be configured to indicate a presence or an absence of the object in the first subset of features.

In some implementations, the combining of the outputs of individual ones of the plurality of sub-classifiers may be effectuated by an aggregation spiking neuron configured to receive individual ones of the singular spike of individual sub-classification outputs. An operation of the aggregation spiking neuron may be adjustable based on the singular spike of individual sub-classification outputs. A given singular spike may be characterized by a sub-classifier latency, which may be configured based on a function of a probability of the object being present in a given subset of features. The classification output may comprise at least one output spike characterized by a latency configured to indicate presence or absence of the object in the image.

In some implementations, the latency may be configured based on the function of the probability of the presence of the object in the image.

In some implementations, the function may include one or more of a logarithm function, an exponential function, a temporal difference function, and/or other functions.

In some implementations, the function may comprise a logarithm. The combination may be effectuated by an addition of a plurality of values representing a plurality of probabilities of the object being present in the digital image.

In some implementations, a given sub-classification output may comprise a plurality of spikes characterized by a spike rate. The spike rate may be configured to indicate a probability of presence of the object in the digital image.

In some implementations, a given sub-classification output may comprise one or more spikes. A number of the one or more spikes may be configured to encode a probability of the object being present in the digital image.

In some implementations, individual subsets of the vector of features may operate in parallel to contemporaneously produce outputs of individual ones of the sub-classifiers.

In some implementations, a number of features in the first subset may be smaller than the number of the vector of features. The number of the plurality of neurons within individual sub-classifiers may be at least twice the number of vector of features in the first subset.

In some implementations, the first subset may comprise a first feature and a second feature. Providing the portion of the spiking input and providing the portion of the inverted spiking signal may comprise: providing the spiking input associated with the first feature and the second feature to a first neuron of the plurality of neurons of the first sub-classifier; providing the spiking input associated with the first feature and the inverted input associated with the second feature to a second neuron of the plurality of neurons of the first sub-classifier; providing the inverted signal associated with the first feature and the spiking input associated with the second feature to a third neuron of the plurality of neurons of the first sub-classifier; and providing the inverted signal associated with the first feature and the second feature to a fourth neuron of the plurality of neurons of the first sub-classifier.

Another aspect of the disclosure relates to a computer-readable storage medium having instructions embodied thereon. The instructions may be executable by a processor to perform a method for training an object classifier spiking neuron network. The method may comprise: providing input representing a vector of features characterizing an image, individual ones of the vector of features capable of representing one or more aspects of an object; partitioning the vector of features into subsets, a given subset including one or more features; for a given subset: providing a portion of the input associated with features of the given subset to a given sub-classifier comprising spiking neurons; providing a training signal indicating presence or absence of the object in the image; based on the training signal and the portion of the input, adjusting a state of individual ones of the spiking neurons; based on the adjusted states, generating an output by a singular neuron of the spiking neurons comprised by the given sub-classifier; combining outputs provided by individual sub-classifiers associated with the subsets to produce a classification signal, the classification signal being configured to indicate presence or absence of the object in the image; and providing a feedback signal to individual ones of the spiking neurons, the feedback signal being configured based on the classification signal and the training signal, the feedback signal configured to increase probability of a match between another classification signal for another training signal.

In some implementations, the feedback signal may be configured based on a comparison between the classification signal and the training signal.

In some implementations, the feedback signal may be configured based on a difference measure between the classification signal and the training signal.

In some implementations, the input may comprise a direct spike train and an inverted spike train. The inverted spike train may be configured to be complementary to the direct spike train.

In some implementations, the partitioning may comprise randomly selecting a subset from the vector of features.

In some implementations, the vector of features may comprise a plurality of binary features. Individual ones of the plurality of binary features may be characterized by inclusion in one of two categories.

Yet another aspect of the disclosure relates to a spiking neuron network object classification apparatus configured to detect an object in sensory input comprising a plurality of features representative of the object. The apparatus may comprise one or more processors configured to execute computer program modules. The computer program modules may comprise an input layer module, an inversion layer module, and a classification module. The input layer module may be configured to provide an input layer comprising input spiking neurons. A given input spiking neuron may be configured to provide a spiking input indicative of an individual feature of the plurality of features. The inversion layer module may be configured to provide an inversion layer comprising inversion spiking neurons. A given inversion spiking neuron may be configured to invert the spiking input of the respective input neuron. The classification module may be configured to provide a classification block comprising: an output neuron configured to produce output characterizing a probability of presence of the object in the sensory input; sub-classifiers neurons partitioned into sub-classifiers comprising two or more sub-classifier neurons; and connections configured to couple individual ones of the sub-classifier neurons to the output neuron. Individual ones of the two or more sub-classifier neurons may be configured to receive a portion of the spiking input and a portion of the inverted spiking input. The portion of the spiking input and the portion of the inverted spiking input may be associated with a respective sub-set of the features. Ffor a given sub-classifier, a singular active neuron of the two or more neurons may be configured to generate a spiking output indicative of probability of the object being present in the sensory input given the respective sub-set of features of the plurality of features.

In some implementations, the spiking output may be generated based on: (i) a state adjustment of the singular active neuron based on the portion of the spiking input and the portion of the inverted spiking input; and (ii) a training signal indicating a presence or an absence of the object in the sensory input.

In some implementations, the state adjustment may be based on a ratio between (i) a number of sub-classifier outputs indicating the presence of the object in the sensory input, and (ii) a number of total sub-classifier outputs for the respective one of the plurality of sub-classifiers.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

Figure 1A:
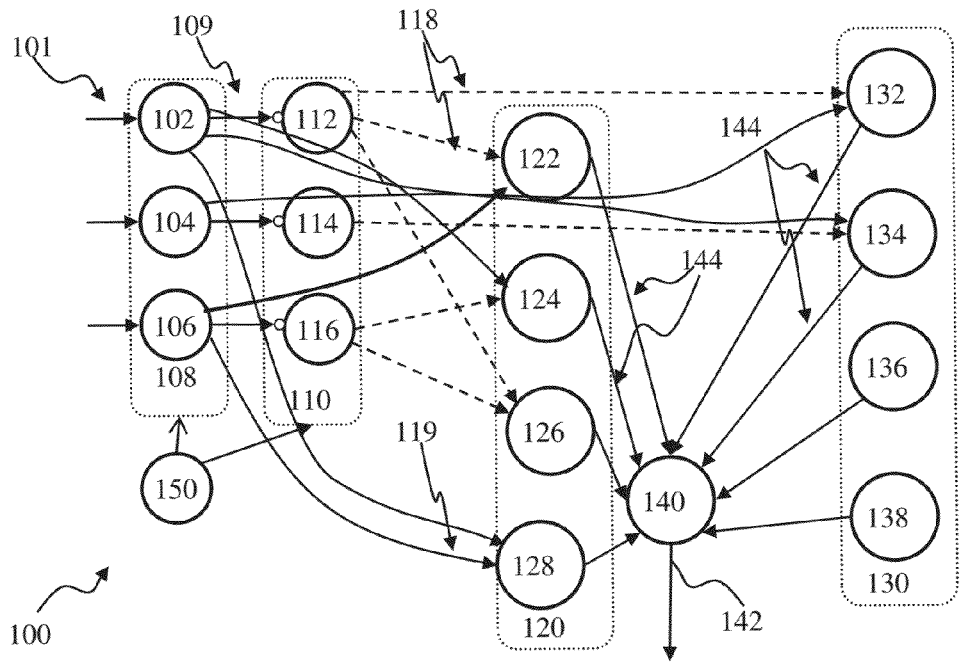
FIG. 1A is a block diagram illustrating a spiking neuron classifier network comprising an input inversion layer, according to one or more implementations.

All Figures disclosed herein are © Copyright 2013 Brain Corporation. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation or implementation, but other implementations and implementations are possible by way of interchange of or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present invention will be described, and detailed descriptions of other portions of such known components will be omitted so as not to obscure the disclosure.

In the present specification, an implementation showing a singular component should not be considered limiting; rather, the invention is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" may be electrical, optical, wireless, infrared, and/or another type of communication medium. The exact topology of the bus could be for example standard "bus", hierarchical bus, network-on-chip, address-event-representation (AER) connection, and/or other type of communication topology used for accessing, e.g., different memories in pulse-based system.

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB™, PASCAL, Python, assembly language, markup languages (e.g., HTML, SGML, XML, VoXML), object-oriented environments (e.g., Common Object Request Broker Architecture (CORBA)), Java™ (e.g., J2ME, Java Beans), Binary Runtime Environment (e.g., BREW), and/or other programming languages and/or environments.

As used herein, the terms "connection", "link", "transmission channel", "delay line", "wireless" may include a causal link between any two or more entities (whether physical or logical/virtual), which may enable information exchange between the entities.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), application-specific integrated circuits (ASICs), and/or other types of integrated circuits.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the terms "node", "neuron", and "neuronal node" are meant to refer, without limitation, to a network unit (e.g., a spiking neuron and a set of synapses configured to provide input signals to the neuron) having parameters that are subject to adaptation in accordance with a model.

As used herein, the terms "state" and "node state" is meant generally to denote a full (or partial) set of dynamic variables used to describe node state.

As used herein, the term "synaptic channel", "connection", "link", "transmission channel", "delay line", and "communications channel" include a link between any two or more entities (whether physical (wired or wireless), or logical/virtual) which enables information exchange between the entities, and may be characterized by a one or more variables affecting the information exchange.

As used herein, the term "Wi-Fi" includes one or more of IEEE-Std. 802.11, variants of IEEE-Std. 802.11, standards related to IEEE-Std. 802.11 (e.g., 802.11a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (e.g., IrDA), and/or other wireless interfaces.

In one or more implementations, a statistical classifier with conditionally independent feature subsets may be implemented using a spiking neuron network, such as exemplary network 100 illustrated in FIG. 1A. The network 100 may be configured as a binary discrete classifier configured to detect one or more features in the sensory input 101. The sensory input 101 in FIG. 1A may comprise, for example, an audio signal, a video signal (e.g., a stream of image frames), and/or other input. In some implementations, the sensory input 101 may comprise image frames (such as frames 200, 210 shown in FIG. 2) that are generated by an image sensor (e.g., a CCD, a CMOS, and/or other sensor device). In one or more implementations, the input may comprise a pixel stream downloaded from a file. By way of non-limiting example, such a pixel stream may include a stream of two-dimensional matrices of red-green-blue (RGB) values (e.g., refreshed at a 24 Hz or other suitable frame rate). It will be appreciated by those skilled in the art given this disclosure that the above-referenced image parameters are merely exemplary, and many other image representations (e.g., bitmap, luminance-chrominance (YUV, YCbCr), cyan-magenta-yellow and key (CMYK), grayscale, and/or other image representations) may be applicable to and useful with the present disclosure. Furthermore, data frames corresponding to non-visual signal modalities (e.g., sonograms, IR, radar, tomography images, and/or other non-visual signals) may be compatible with the processing network of FIG. 1. Local binary pattern feature detectors may be used on the image frames in order to lower the data dimensionality and to generate a binary output.

Figure 2A:
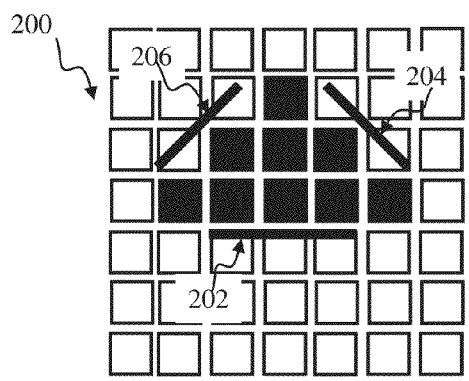
FIGS. 2A and 2B are graphical illustration depicting object features for use with a spiking neuron network classifier, according to one or more implementations.
Figure 2B:
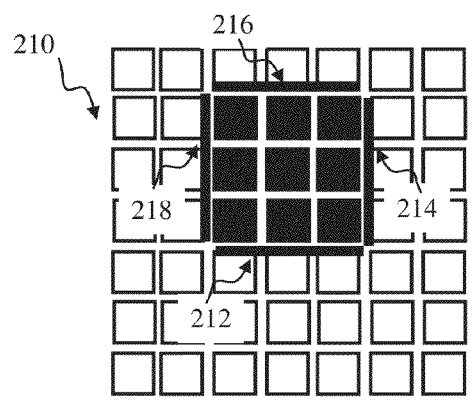

In some implementations, the input frames 200, 210 of FIG. 2 may represent one or more objects, such as a triangle and a rectangle in FIG. 2, respectively. In one or more implementations, the sensory input 101 of FIG. 1A may comprise a pre-processed input, where the pixel frames 200, 210 are used to produce a pre-processed input. In some implementations of, for example, local binary patterns used in texture classification, the pre-processing may comprise assigning a pixel value based on two or more neighboring pixel values. The output of the pre-processing operation may comprise one or more features of objects (e.g., the triangle and the square FIG. 2). In one or more implementations, the features may represent object edges as shown by the bold lines 202, 204, 206 associated with the triangle in frame 200 and lines 212, 214, 216, 218 associated with the square in frame 210 of FIG. 2. One or more of features 202, 204, 206, 212, 214, 216, 218 may form an n-feature set input $f_i$ i=1, n, to the classifier (e.g., the sensory input 101 in FIG. 1A). An appropriate choice of features may be learned from the input such as by using a principle component analysis, an independent component analysis, and/or another analysis.

Returning now to FIG. 1A, the network 100 may be configured to produce output 142 based on the sensory input 101. In some implementations, the network of FIG. 1A may be configured to implement a classification/detection of the input frame stream comprising objects. The classifier may be configured to respond to the following one or more questions: "Is an object present?", "Is the object a square?", "Is the object a triangle?", and/or other questions. The output may be probabilistic to communicate the uncertainty and/or noise in the observation. For example, when responding to a question such as "What is the probability this image contains a triangle?", the output may be probabilistic.

When processing the input frame stream comprising object features, the classifier of FIG. 1A may be configured to respond to the following one or more questions: "Is a feature present?", "Is a horizontal bar present?", "Is a vertical bar present?", and/or other questions.

In some implementations, the network 100 may be configured to implement a data regression process and/or to produce the estimate 142. For example, the network 100 may be configured to estimate the reward and/or pain of an encounter with an object (e.g., in some arbitrary units). As another example, the network 100 may be configured to estimate the cost of a house based on features describing the house (e.g., size, location, age, and/or other features).

The input may comprise spiking output of one or more neurons. The spiking output of the one or more neurons may be configured to detect edges (e.g., 202, 204 in FIG. 2), pixel configurations (e.g., two or more dark pixels within an area) in the pixel frames (e.g., 200, 210 of FIG. 2), and/or other information.

The sensory input 101 may be coupled to an input neuron layer 108 comprising neurons 102, 104, 106. While the exemplary network implementation illustrated in FIG. 1A may be configured to process input comprised of three features, it will be appreciated by those skilled in the arts that inputs comprising many more features and/or objects may be processed by a spiking network apparatus using the generalized methodology described herein.

In one or more implementations, such as illustrated in FIG. 1A, the network may comprise an input inversion layer 110. The input inversion layer 110 may comprise the neurons 112, 114, 116. The input inversion layer 110 may be configured to receive the sensory input 101 via the inverting connections 109 (denoted by arrows with the open circle in FIG. 1A). In some implementations, the neurons of the input/inversion layer may relay/invert the received input without additional processing.

Figure 15A:
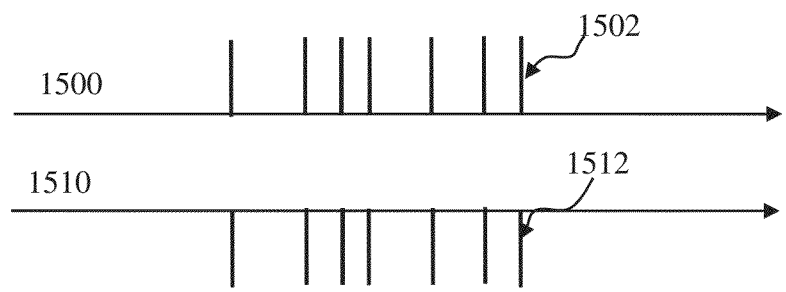
FIG. 15A is a plot illustrating spiking signal inversion for use with the classifier networks of FIGS. 1A, 2B, 3, 4, in accordance with one or more implementations.

In some implementations, such as illustrated in FIG. 15A, input inversion may comprise inverted (e.g., negative) spike signal. The trace 1500 in FIG. 15A denotes direct spiking input comprising one or more spikes 1502. The trace 1510 in FIG. 15A denotes inverted spiking input comprising one or more negative spikes, where individual inverted spikes (e.g., 1512) correspond to a time of the direct input spikes (e.g., 1502).

Figure 15B:
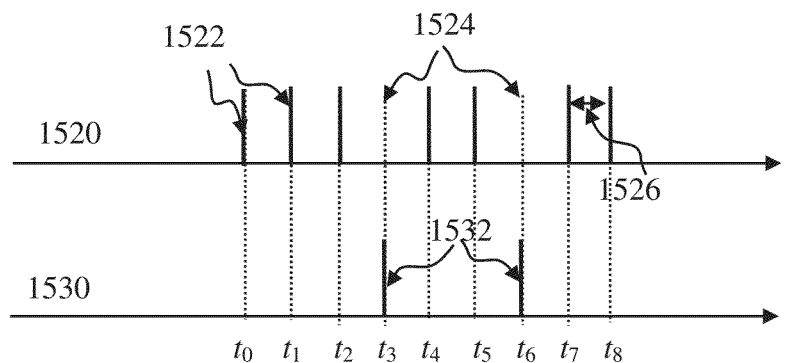
FIG. 15B is a plot illustrating complementary spiking signal inversion for use with the classifier networks of FIGS. 1A, 2B, 3, 4, in accordance with one or more implementations.

In one or more implementations of synchronous (e.g., regularly spaced) spiking input, such as illustrated in FIG. 15B, input inversion may comprise a complementary spike signal. The trace 1520 in FIG. 15B depicts direct spiking input comprising one or more spikes 1522 that may occur at regular intervals 1526. The direct input 1520 may comprise one or more intervals characterized by absence of spikes (e.g., 1524 in FIG. 15B). The trace 1530 in FIG. 15A depicts inverted spiking input comprising one or more spikes 1532. The inverted signal 1530 may be determined using a complementary (NOT) operation. According to some implementations, a complementary operation may dictate (1) for a given interval (e.g., e.g., times $t_0$-$t_2$, $t_4$-$t_5$, $t_7$-$t_8$) responsive to the direct input 1520 comprising a spike, the inverted input 1530 is silent; and (2) responsive to the direct input 1520 being silent, the inverted input 1530 comprises a spike (e.g., e.g., times $t_3$, $t_6$).

Figure 15C:
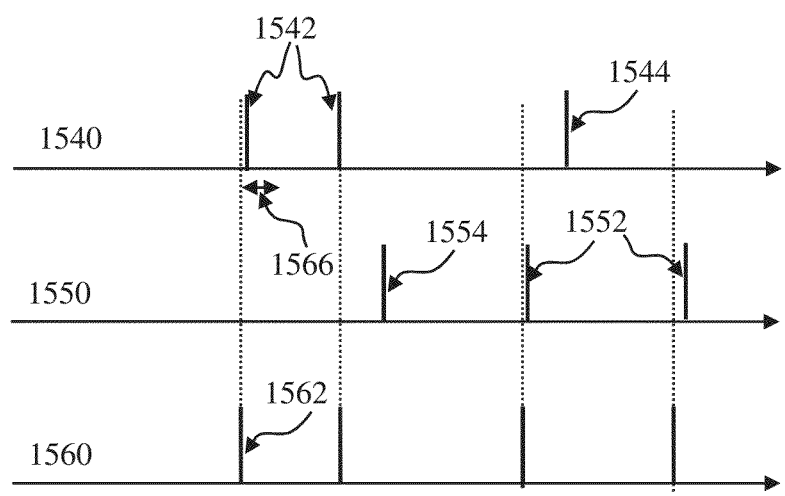
FIG. 15C is a plot illustrating use of latching mechanism for spiking signal inversion for use with the classifier networks of FIGS. 1A, 2B, 3, 4, in accordance with one or more implementations.

In some implementations, such as illustrated in FIG. 15C, input inversion may be augmented by a latching mechanism. The trace 1540 in FIG. 15C depicts direct spiking input comprising one or more spikes 1542, 1544. The trace 1540 in FIG. 15C depicts inverted spiking input comprising one or more spikes 1552, 1554. The inverted input 1550 may be configured complementary to the direct input, so that a single of the two inputs 1540, 1550 may be active for a given time interval (e.g., 1566 in FIG. 15C). It is noteworthy that input inversion configuration illustrated in FIG. 15C may be utilized with spiking inputs, which may occur at irregular intervals. The trace 1550 in FIG. 15C depicts latching spiking signal comprising one or more spikes 1562. The latching signal 1560 may be utilized as a gating mechanism in order to control input into a classifier (e.g., the input 101 of FIG. 1A). For example, responsive to the latching spike (e.g., 1562) occurring, the direct or the inverted signal spikes (that may occur within an interval 1566 from the latching spike) may be provided as inputs into the classifier (e.g., the spikes 1542, 1552 in FIG. 15C). Responsive to the latching signal being inactive (e.g., no spikes occur), the direct and/or the inverted signal spikes (e.g., the spikes 1444, 1554 in FIG. 15C) may be ignored.

Figure 1B:
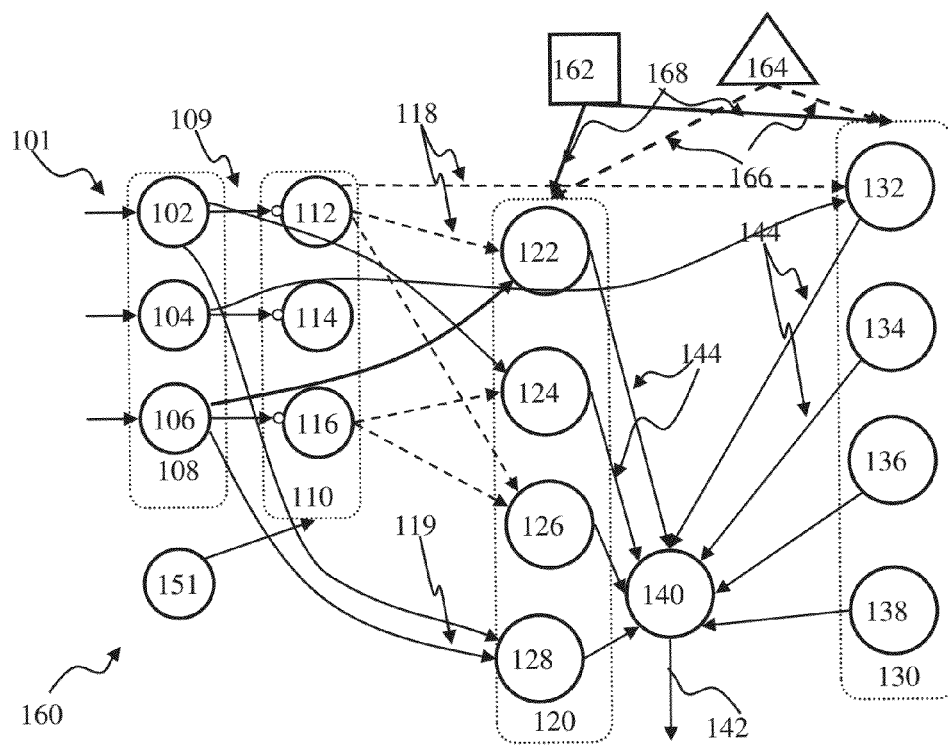
FIG. 1B is a block diagram illustrating training of the spiking neuron classifier network of FIG. 2A, according to one or more implementations.

In some implementations, such as illustrated in FIGS. 1A-1B, the latching signal 1560 may be provided to the neurons of the direct and the inversion layer (e.g., the neurons 102, 104, 106, 112, 114, 116) by a spiking neuron 150 as illustrated in FIG. 1A. In some implementations, where the direct and the inverted signals are complementary (e.g., when only one of the inputs comprises a spike for a given time interval as shown in FIG. 15B), the latching signal 1560 may be provided to the neurons of the inversion layer (e.g., the neurons 102, 104, 106, 112, 114, 116) by a spiking neuron 151 as illustrated in FIG. 1B.

In one or more implementations (not shown), the input/inversion layer may be implemented using connection from the feature detectors to sub-classifier layers.

Figure 3:
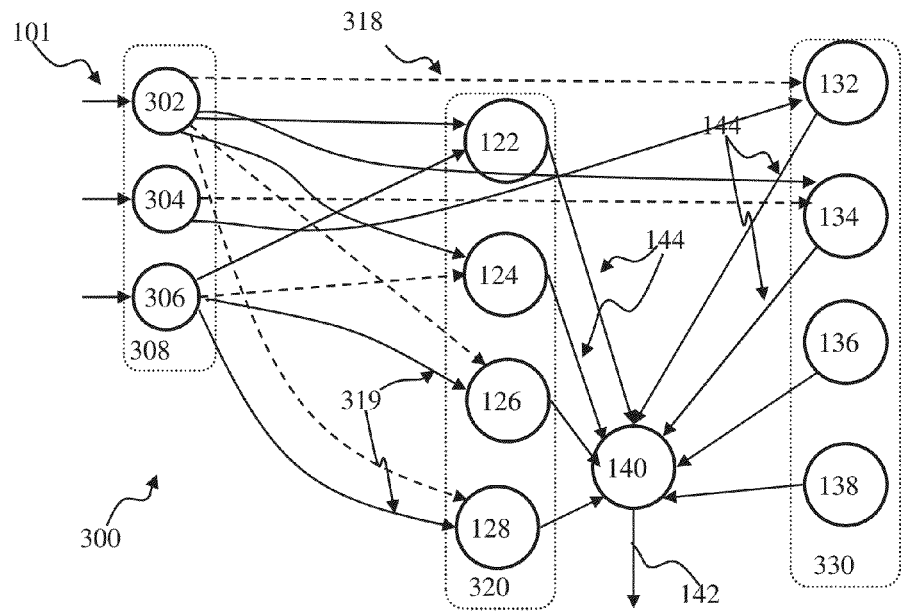
FIG. 3 is a block diagram illustrating a spiking neuron classifier network comprising inverting input connections, according to one or more implementations.

In some implementations, such as illustrated in FIG. 3, the network 300 may comprise input inversion connections 318 (denoted by broken line arrows coupling the input layer 308 and the subset layers 320, 330 in FIG. 3). For clarity, only connections $(-f_1, f_2)$, $(f_1, -f_2)$, are shown in FIG. 3 for the sublayer 330, however other connections may exist. The neurons 302, 304, 306 of the input layer 310 in FIG. 3 may be configured to provide direct input (via the connections 119) and/or inverted input (via the connections 318) to the subset layers 320, 330. In one or more implementations, the output of the input layer may comprise a positive spike (e.g., a spike of positive amplitude and/or sign) in response to detection of the corresponding feature corresponding feature (e.g., the presence of an edge at a certain position and/or orientation). In one or more implementations, the inverted output may comprise a negative spike in response to absence of the respective feature. In some implementations, the neurons may spike when there is no edge of a certain orientation and/or position.

Network 100 of FIG. 1A and/or network 300 of FIG. 3 may be configured to implement a Bayes classifier with conditionally independent given the input features subsets (fern classifier). In some implementations, the input feature set $f_i$ $i=1 \ldots N$, may be partitioned into subsets comprising K elements (KEN). Such an approach may utilize a tradeoff between the complexity of full Bayes classifier and the tractability of fully independent (naïve) Bayes classifier by creating sub-classifiers which become experts of smaller combinations of features:

$$p(C|x) = p(C) \Pi_{j=1}^{M} p(x_{f_{j,1} \ldots f_{j,k}}|C), K \leq N \qquad \text{(Eqn. 1)}$$

where:

$p(C|x)$ is described by combinations of M smaller subsets of K features; and $f_{j \ldots}$ refer to the indices of features for sub-classifier j.

In some implementations, the subsets used to determine p(C|x) may be of different sizes. The feature indices in Eqn. 1 for individual subset may be chosen randomly with replacement. According to some implementations, features included in one subset may not be excluded from being picked in a separate subset. That is, a given feature may be included in multiple subsets. It is noteworthy that the parameters for the number and size of the sub-classifiers may allow direct manipulation of the complexity-accuracy tradeoff of the model. Information about the structure of a problem may be used in order to assign features to subsets in a more optimal way than random. The structure of the problem may be described as knowledge of particular feature combinations that are informative. An example may include a visual search where it is known that color and orientation were an informative combination. By way of a non-limiting example, when it is known that two features are only informative together (e.g., a hockey puck is a disk and is black) they may be placed in the same subset. Note that the parameters for the number and size of the sub-classifiers may allow direct manipulation of the complexity-accuracy tradeoff of the application.

As shown in FIG. 1A, the network 100 may comprise two subset layers (sub-classifiers) 120, 130, so that M=2 and K=2 in Eqn. 1. The subsets elements of FIG. 1A may be selected as follows $$\text{subset}_1 = \{f_1, f_3\}.$$

$$\text{subset}_2 = \{f_1, f_2\} \quad \text{(Eqn. 2)}$$

The neurons 122, 124, 126, 128 of the subset layer 120 may receive the following inputs:

$$\text{SubsetLayer}_1 = \{(-f_1, f_3), (f_1, -f_3), (-f_1, f_3), (f_1, f_3),\}, \quad \text{(Eqn. 3)}$$

respectively.

The neurons 132, 134, 136, 138 of the subset layer 130 may receive the following inputs:

$$\text{SubsetLayer}_2 = \{(-f_1, f_2), (f_1, -f_2), (-f_1, -f_2), (f_1, f_2),\}, \quad \text{(Eqn. 4)}$$

respectively. For clarity, only connections $\{(-f_1, f_2), (f_1, -f_2),$ are shown in FIG. 1A for the sublayer 130, however more connections may exist. Solid line arrows 119 and broken line arrows 118 in FIG. 1A depict provision of positive and negative inputs, respectively, to neurons of the subset layers 120, 130.

Individual subset layers 120, 130 may be comprised of $2^K$ neurons (e.g., four neurons for K=2 in FIG. 1A). In one or more implementations, such as illustrated in FIG. 1A, individual neurons 122, 124, 126, 128, 132, 134, 136, 138 of the subset layers 120, 130 may be configured to implement classification learning. The neurons 122, 124, 126, 128, 132, 134, 136, 138 may receive two inputs (either a direct or inverted) representing features within the sensory input 101. For a set of input features, a single neuron may be activated within individual subsets 120, 130. The neurons 122, 124, 126, 128, 132, 134, 136, 138 may encode their classification estimates into one or more output spikes using temporal latency encoding. One or more implementations of latency encoding are described with respect to FIG. 12 below. The neurons of the subset layers 120, 130 may communicate their output to the neuron 140 via connections 144. The neuron 140 may be referred to as the output and/or aggregation neuron. In one or more implementations, the output of the subset layers may be aggregated using a hierarchy of aggregation neurons. The hierarchy of aggregation neurons may be referred to as the aggregation layer. By way of illustration, in an implementation where the number of synapses per neuron is limited to eight, an output of 128 subsets (e.g., 130, 140 in FIG. 1A) may be aggregated by sixteen aggregation neurons of a first aggregation level, followed by two aggregation neurons of the second aggregation level, followed by the output aggregation neuron.

The network implementation illustrated in FIG. 1A may utilize 2×M×K fern neurons and 2×M×K subset synapses. In one or more implementations comprising feedback connections (not shown), the network may utilize 4×2×M×K subset synapses, with two feedback synapses for an individual subset unit (one output synapse and one input synapse). The number of input/inversion neurons may be configured based on the number of input features.

In one or more implementations, the neuron 140 of FIG. 1A may be configured to produce output signal 142 in accordance with a learning rule. In one or more implementations, the learning rule may be configured to effectuate a classification and/or a detection process. The output signal may correspond to a classifier output. Examples of classifier output may include one or more of a discrete binary output (e.g., 'YES'/'NO' or '1'/'0'), a statistical output p characterizing a probability of detection, and/or other outputs. In some implementations, the learning rule may be configured to effectuate parameter estimation and/or regression. The output signal 142 may correspond to the estimated parameter. Examples of the estimated parameter may include one or more of a probability of detection, an estimate of input novelty, model error, and/or other parameters. In one or more implementations, the output neuron 140 may employ a threshold mechanism for generating one or more output spikes (e.g., the signal 142). When the classification probability (e.g., a positive or a negative answer) is breaches a certain value (i.e., a threshold), the neuron may generate one or more output spikes. By way of an illustration, in a floor classification application by a robotic device (e.g., shown and described with respect to FIG. 5A, below) the neuron 140 may generate responses based on detected absence of the floor in front of the robotic device in order to trigger obstacle avoidance.

FIG. 1B illustrates training of the network 100, using training input 162, 164. The neurons 122, 124, 126, 128, 132, 134, 136, 138 may compare the output 118, 119 and the training signal 162, 168 in order to produce an estimate of a match between the input feature and the training feature. In some implementations (e.g., classification), the estimate may correspond to a classification output. In one or more implementations (e.g., regression), the estimate may describe the regression parameter estimate. The training signal may correspond, in some implementations, to a 'label' associated with the input object being classified (e.g., a triangle or a square) or the correct parameter (e.g., 142). In one or more implementations of a binary classifier, the training signal may comprise labels 'YES'/'NO' and/or '1'/'0'. Although for clarity the provision of the training input 162, 164 in FIG. 1B is depicted by a single arrow per subset layer (e.g., the arrows 168, 166, respectively), the training input 162, 164 may be provided to individual neurons 122, 124, 126, 128, 132, 134, 136, 138.

Learning may occur by the direct action by the feedback synapses on the state of unit of the sub-classifier. State parameters of recently active units (e.g., those that were activated by the set of input features corresponding to the training example) may be modified. Data related to unit activity time may be stored in unit-specific and/or shared memory.

In one or more implementations, neurons 122, 124, 126, 128, 132, 134, 136, 138 may be configured to implement a maximum likelihood approach and supervised learning in order to produce the classification estimate. During training (e.g., supervised learning), the neurons of the layers 120, 130 may be configured to determine and store number of positive ($N_{C=1}$) and total (N) inputs they receive. In some implementations, the positive input may correspond to the neurons 122, 124, 126, 128, 132, 134, 136, 138 receiving a training signal 162 comprising the label 'YES' associated with the sensory input 101.

During operation, for a received input, individual neurons of subset layers 120, 130 may determine a classification estimate as follows, in accordance with one or more implementations:

$$p_j(C=1 \mid x_{f_{j,1}\ldots f_{j,q}}) = \frac{N_{y=1}(x_{f_{j,1}\ldots f_{j,q}})}{N(x_{f_{j,1}\ldots f_{j,q}})}, \quad \text{(Eqn. 5)}$$

where N(x) is the number of occurrences of x in the training set and Nc=i is the number of occurrences that were positive.

In some implementations, the classification estimate may incorporate a uniform (e.g., a Dirichlet) prior probability as follows:

$$p_j(C=1 \mid x_{f_{j,1}\ldots f_{j,q}}) = \frac{N_{C=1}(x_{f_{j,1}\ldots f_{j,q}}) + N_r}{N(x_{f_{j,1}\ldots f_{j,q}}) + KN_r}, \quad \text{(Eqn. 6)}$$

where:

$N_r > 0$;

K is the number of classes (K=2 in the implementation illustrated in FIG. 1A); and $N_r$ is a regularization parameter.

The rule of Eqn. 6 may have the effect that probability estimate p(C=1) of the subset remains near 0.5 when the subset has been exposed to only a few trials. When $N_{C=1}=0$ (i.e., absence of prior positive events) the classifier may produce output p(C=1)<<1. In one or more implementations, the output p(C=1)<<1 may correspond to the 'NO'/'0' answer. When p(C=1)≈N (i.e., most prior events are positive) the classifier may produce output p(C=1)≈1. In one or more implementations, the output p (C=1)≈1 may correspond the 'YES'/'1' answer.

When the learning problem is stationary (i.e., the correct label and statistics of the input do not change over time), a memory may be full. In some implementations, the time duration for which the parameters $n_p$, n are stored may be reduced to implement 'memory loss' and/or aging. In one or more implementations, aged data may be discounted using a uniform criterion. In some implementations, occurrences in the parameters $N_{C=1}$, N that are older than J number of trials may be discarded. For example, in the floor detection task, if the floor looks different in regions of the building, the system may set J to be 10,000 frames so that it is able to adapt to the changing statistics of the floor. In one or more implementations, aged data may be discounted using a non-uniform functions F1, F2, (e.g., linear, exponential, logarithmic, and/or other distribution) of time as follows:

$$p_i = \frac{F1(N_{C=1}, t)}{F2(N, t)} \quad \text{(Eqn. 7)}$$

Classification estimates produced by individual neurons 122, 124, 126, 128, 132, 134, 136, 138 in accordance with the learning rule (e.g., the rules of Eqn. 5-Eqn. 7 and/or other rules) may be encoded into spike latency.

In the network implementations illustrated and described with respect to FIGS. 1A, 1B, 3 above, classification learning may be effectuated in the neurons of the subset layers (e.g., 120, 130 in FIG. 1A). In some implementations, the neurons of the subset layers may encode their output in spike latency, as described in detail below with respect to FIG. 13. Latency encoding may utilize fewer neuron-to-neuron connections (compared to multi-bit bus transmission), and/or provide for a reduced bus activity (compared to serial bit encoding). It may be desired, in some implementations, to reduce latency associated with the learning being implemented by the neurons of the subset layers in the networks of FIGS. 1A, 1B, 3, while maintaining these advantages of latency encoding. It may be desired, in some implementations, to reduce the number of synapses in the network in order to reduce computational resource requirements and/or to achieve lower power, cost, and/or sized neuromorphic processing system. It may be preferable, in some implementations, to encode classification learning in the connections and/or to allow for a flexible learning rule implementation.

Figure 4:
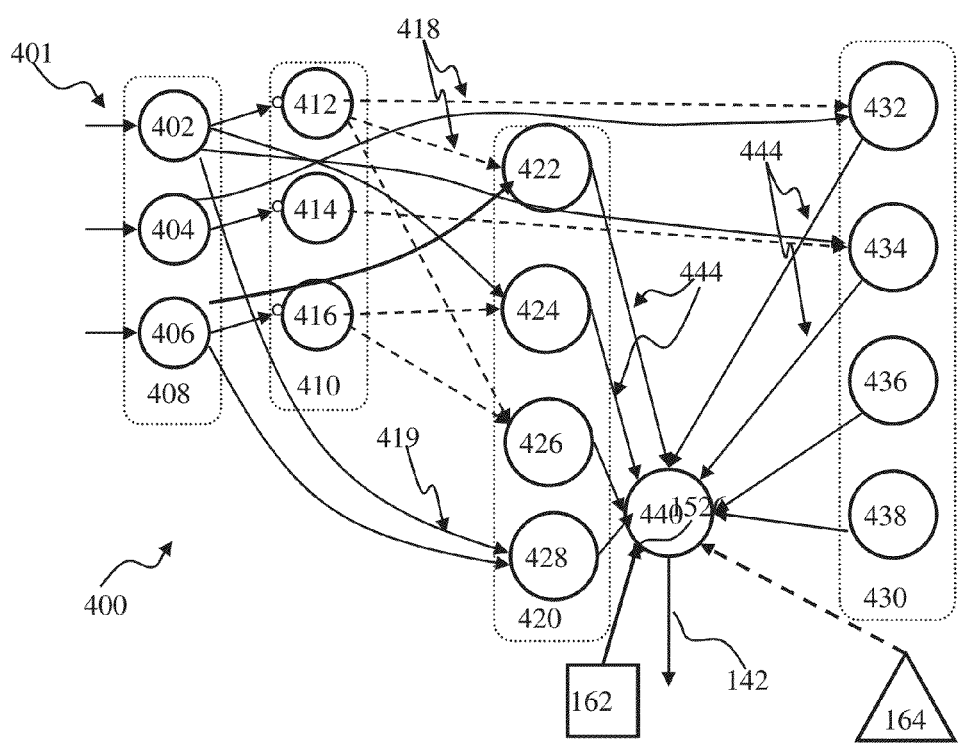
FIG. 4 is a block diagram illustrating low-latency spiking neuron network classifier, according to one or more implementations.

FIG. 4 illustrates a classifier network comprising learning implemented in the connections 444 between individual neurons of the subset layers 420, 430 and the output neuron 440. For clarity, only connections {(-$f_1$, $f_2$), ($f_1$, -$f_2$), are shown in FIG. 3 for the sublayer 430, however other connections may exist. The neurons of the subset layers 420, 430 may communicate their output to the neuron 140 via the connections 444. When utilizing Elementary Network Description (END) language and/or High Level Neuromorphic Description (HLND) framework, in some implementations, the learning architecture shown and described with respect to FIG. 4 may allow for a reduced latency between the receipt of the input and the generation of the classification output. This reduction may be due to, at least partly, the ability of the connections 444 in FIG. 4 to communicate their state parameters (e.g., classification probability) to post-synaptic units (e.g., the aggregation neuron 440 in FIG. 4). Connections 444 may be described as HLND synapse objects. Elementary Network Description (END) language is described in an exemplary manner in U.S. patent application Ser. No. 13/239,123, entitled "ELEMENTARY NETWORK DESCRIPTION FOR NEUROMORPHIC SYSTEMS WITH PLURALITY OF DOUBLETS WHEREIN DOUBLET EVENTS RULES ARE EXECUTED IN PARALLEL", filed Sep. 21, 2011, which is incorporated herein by reference in its entirety. High Level Neuromorphic Description (HLND) framework is described in an exemplary manner in U.S. patent application Ser. No. 13/385,938, entitled "TAG-BASED APPARATUS AND METHODS FOR NEURAL NETWORKS", filed Mar. 15, 2012, and patented as U.S. Pat. No. 8,312,939 on Apr. 29, 2014, which is incorporated herein by reference in its entirety.

In the implementation illustrated in FIG. 4, the binary input 401 may be passed through an input layer 408 and the input inversion layer 410. The input data may be coupled to subset layers 420, 430. Individual neurons 422, 424, 426, 428, 432, 434, 436, 438 of individual sub-classifiers 420, 430 may respond per input. In the implementation of FIG. 4, classification learning may be embodied in the synapses 444. The output of the neurons 422, 424, 426, 428, 432, 434, 436, 438 may be characterized by an absence of additional latency, which may be present in the output of the neurons 122, 124, 126, 128, 132, 134, 136, 138 of classifier implementations illustrated in FIGS. 1A, 1B, and 3. The outcome of the learning within the synapses 444 may be communicated to the output neuron by direct manipulation of the output neuron 440 state by the synapses 444. For example, the output neuron state may comprise two floating points capturing the log likelihood of a positive and negative input (in the binary classification task). The input synapse may add its estimate of the likelihoods to the output neuron state so that after all active synapses update the state the output neuron state contains the Bayes optimal estimate of the classification.

In the implementation illustrated in FIG. 4, learning may occur via post-synaptic events for the output neuron 440. The synapse learning may be effectuated using feedback, provided by the output neuron (440). IN some implementations, the feedback may be based on one or more post-synaptic events (e.g., output spikes) generated by the output neuron. The synapses previously activated by the input may modify their state based on the one or more post-synaptic events, thereby effectuate the learning from the training examples. In some implementations, the supervised classification (i.e., training) may be communicated by the post-synaptic event type. In some implementations, the supervised classification (i.e., training) may be communicated by setting a flag in the output neuron 440. By way of a non-limiting example, the flag may indicate whether the label is positive or negative. When a postsynaptic event is executed, the flag content may be read by the output neuron in order to determine whether the neuron state is to be modified based on the flag.

In some implementations, previously active synapses may be modified responsive to the supervisory signal being provided. In order to perform synaptic updates more efficiently, END framework may be utilized. In some implementations, synaptic updates may be performed more efficiently by only processing synapses of an active neuron within individual ferns for a given input. By way of illustration, an END implementation, comprising a windowing function characterized by an activity time interval, may be used in order to select synapses that have been active within the activity interval prior to the event. In one or more implementations of END, such as, for example described in END 3.0, the learning may be performed lazily. Lazy performance may refer to instances where states of synapses are update when the synapses are communicating spikes (e.g., re-synaptic updates). In such implementations, the post-synaptic updates may be delayed until a subsequent pre-synaptic update.

Implementation of FIG. 4 may produce a shorter latency (i.e., higher response rate) compared to the implementations of FIGS. 1A-1B. In the implementation of the network 400 illustrated in FIG. 4, 2×M×K synapses may be used, which is smaller compared to the implementation of FIG. 1A. This reduction may be due, at least in part, to provision of the supervisor (training) signal to the output neuron 440 instead of to individual neurons 122, 124, 126, 128, 132, 134, 136, 138 in the implementation of FIG. 1B.

It will be recognized by those skilled in the arts that network configurations illustrated in FIGS. 1A, 1B, 3, 4 are exemplary and are provided in order to illustrate principles of the disclosure. Various other network configurations may be utilized as well such as, for example, configurations comprising an object incorporating a neuron (e.g., 122, 422, 124, 440) and a connection (144, 444) into a single network entity. The classification methodology comprising conditionally dependent subsets described herein may enables local computation of classification estimates (by, for example, neurons of layers 120, 130 of FIG. 1A and/or connections 444 in FIG. 4) and event based communication.

In some implementations, the rules of Eqn. 5-Eqn. 6 may be implemented for use by synapses (e.g., the connections 444 in FIG. 4). In some implementations, a given synapse may be configured to store a pair of synaptic parameters (e.g., weights) $N_p$ (indicating a number of positive trials) and $N_t$ (indicating a total number of trials). By way of non-limiting example, responsive to the synapse being active for three frames comprising the floor (e.g., the frames 602 described with respect to FIG. 6A, below) and one input frame that does not comprise floor representation (e.g., 608 in FIG. 6A) $N_p$=3, and $N_t$=4. The connections (e.g., 444 in FIG. 4) may be configured to communicate a classification estimate (e.g., that the presented training example is the floor) obtained using the likelihood rule of Eqn. 5 or Eqn. 6 to the output neuron (e.g., 440 in FIG. 4).

In one or more implementations of a linear regression, individual synapses may compare classification output S° to the training signal $S^d$ in order minimize output error and improve learning by adjusting a learning parameter (e.g., a weight) of the synapse as follows:

$$\theta_{i+1} = \theta_i + \eta(S^o - S^d), \quad \text{(Eqn. 8)}$$

where η denotes a learning rate. The synapses may communicate a value of the respective learning parameter to the output neuron during regression so that the regression output Y may be determined based on a sum of weights $\theta^j$ of individual active synapses j:

$$Y = \Sigma_j \theta^j \quad \text{(Eqn. 9)}$$

In one or more implementations (not shown) where a number of synapses/per neuron are limited, one or more relay neurons may be utilized in order to communicate subset layer output to the output neuron (e.g., 440 in FIG. 4). A number of synapses/per neuron may be limited to $2^n$ due to hardware addressing constraints of an n-wide address bus. By way of a non-limiting example, individual relay neurons may combine inputs from neurons of one or more subset layer (e.g., the neurons 422, 424, 426, 428 in FIG. 4). The subset combined signals may be relayed by the relay neurons to the output neuron 440. In such implementations, the training input 162, 164 may be provided to individuals of the one or more relay neurons. In one or more implementations, the relay neuron(s) and the output neuron 440 may be referred to as the aggregation layer.

Where units can emit multiple event types and/or excite only a subset of their outgoing synapses, individual ferns may be collapsed down to a single (or much smaller) number of units. By way of a non-limiting example, a network may be implemented using HLND methods that may allow a post-synaptic neuron to access state information of a presynaptic neuron during spike delivery. In such a network, individual sub-set layers (e.g., 420, 440 on FIG. 4) may comprise a neuron configured activate the appropriate synapses (e.g., 144 in FIG. 1A) based on the received input feature.

The connections 444 may be operated in accordance with a learning rule characterized by a learning parameter. In one or more implementations, the learning rule may comprise a classification probability. The classification probability may be determined, for example, in accordance with one or more of the rules of Eqn. 5-Eqn. 7 and/or other rules. In some implementations, the learning parameter may comprise a scalar weight. The scalar weight may correspond to the log likelihood of a positive example.

The inputs 444 may be combined by the aggregation neuron(s) 440 in accordance with Eqn. 1.

In some implementations, one or more synapses (e.g., synapses 444 in FIG. 4) may be configured to modify a state of the aggregation layer neurons (e.g., the neuron 440 in FIG. 4) in lieu of using encoded spiking output. In some implementations, various learning rules may be implemented efficiently based on one or more of a maximum likelihood with a prior probability, a gradient descent, a stochastic gradient descent, a least squares minimization, and/or other approaches.

In one or more implementations (e.g., the classifier network of FIG. 4), a modified learning rule may be used to enable the network to perform regression. The synapses 444 may be configured to perform real-valued operations on the output neuron 440 in order, for example, to implement regression. During learning, the neuron 440 may provide a real-valued feedback (and/or a vector feedback) to the sub-set layer neurons 420, 430 and/or the synapses 444. The real-valued feedback (and/or the vector feedback) may be communicated by the output neuron through one or more types of spike encoding, and/or encoded in the output third signal or in the state of the aggregation layer. In some implementations, the synapses 444 may be configured to access post-synaptic (output) state of the neuron 440 to enable the feedback provision.

The output (aggregation) layer may be configured to combine estimates from individual subset layers in order to obtain a classification probability estimate. In one or more implementations of a binary classifier task, the output neuron may be configured to produce the following probability estimate: p(y=1|x), where y may correspond to a label '0' or '1', and x corresponds to the binary input features. In some implementations of n-ary classifier, y may comprise n values (general classification). In some implementations of a regression, y may comprise a scalar or a vector of real values (e.g., distance).

In one or more implementations, where learning is effectuated via synapses (e.g., the synapsed 444 of network 400 of FIG. 4), the subset layer output the aggregation may be implemented in the synapses operating on the output state directly. In some implementations, where learning is effectuated in the subset layer neurons (e.g., the neurons 122, 124, 126, 128, 132, 134, 136, 138 of the network 100 of FIG. 1A), the aggregation functionality may be sub-divided between the neurons communicating the value and the synapses (e.g., 144 in FIG. 1A) integrating the value into the output neuron.

This aggregation may be configured based on the learning rule used by the neurons and/or synapses. For neurons operated in accordance with a stochastic process (e.g., probabilistic classification), individual subsets (e.g., 120, 130 in FIG. 1A) may produce an estimate of probability $p_f(y|x)$ for values of y. The neuron output may be initialized prior to accumulating the output from the synapses (e.g., 140 in FIG. 1A) with the highest entropy estimate:

$$p_o(y|x)=1/n, \tag{Eqn. 10}$$

where n is the number of classification categories (n=2 in the case of binary classifier). In some implementations, the neuron may be initialized with a non-uniform prior probability based on a prior knowledge of the classification likelihoods.

A probability estimate of individual subsets (e.g., 120, 130 in FIG. 1A) for a individual realization of the input x may be combined with the current state of the output neuron as follows:

$$p=p_o(y|x)p_f(y|x). \tag{Eqn. 11}$$

In one or more implementations, the combination of Eqn. 11 may be implemented more efficiently by transforming the probability into a log space as follow:

$$\log(p)=\log(p_o(y|x))+\log(p_f(y|x)), \tag{Eqn. 12}$$

to convert the multiplication operation of Eqn. 11 to the addition operation of Eqn. 12.

In one or more implementations of regression, subset outputs $V_f$ may be combined additively with the aggregated output $V_o$ $$V_o \leftarrow V_o+V_f \tag{Eqn. 13}$$

In some implementations of regression, subset outputs may be combined via an averaging operation:

$$V_o=1/M\Sigma_j V_{f,j}. \tag{Eqn. 14}$$

In one or more implementations to classifying real-valued data (e.g., voltage and/or temperature), the input may be discretized into binary features. In some visual classification applications, the real-valued input data may be filtered prior to the discretization. For example, the input may be compared to a threshold, linearly filtered, and/or non-linearly transformed. Examples of non-linear transforms may include one or more of a sigmoid transform, transformation to a different color space, and/or other non-linear transforms. The discretization may comprise the use of a deterministic or binary threshold in order to generate a high-dimensional binary vector of input features (e.g., the sensory input 101 in FIG. 1A). The discretization may comprise the use of a threshold in order to generate a high-dimensional binary vector of input features (e.g., the sensory input 101 in FIG. 1A).

In one or more implementations, the spiking neuron network fern classifier (e.g., of FIGS. 1A, 1B, 3, 4) may be implemented using elementary network description (END) framework described, for example, in U.S. patent application Ser. No. 13/239,123, entitled "ELEMENTARY NETWORK DESCRIPTION FOR NEUROMORPHIC SYSTEMS WITH PLURALITY OF DOUBLETS WHEREIN DOUBLET EVENTS RULES ARE EXECUTED IN PARALLEL", filed Sep. 21, 2011, incorporated supra.

The neurons of the subset layers (e.g., the neurons 122, 124, 126, 128, 132, 134, 136, 138 in FIG. 1A and/or the neurons 422, 424, 426, 428 in FIG. 4) may communicate a value (e.g., a classification probability of the subset) to the neurons of the aggregation layer (e.g., the neuron 140 in FIG. 1A, and/or the neuron 440 in FIG. 4). The output neuron(s) may communicate a value (e.g., a probability of correct answer) to other entities (e.g., a motor control network block).

In some implementations, the neuron data communication may employ a rate base approach, where the output comprises a plurality of spikes generated at a rate that may be determined based on the value being communicated. In one or more implementations, the rate based output may be generated using a deterministic threshold. In some implementations, the rate based output may be generated using a stochastic neuron process.

Figure 12:
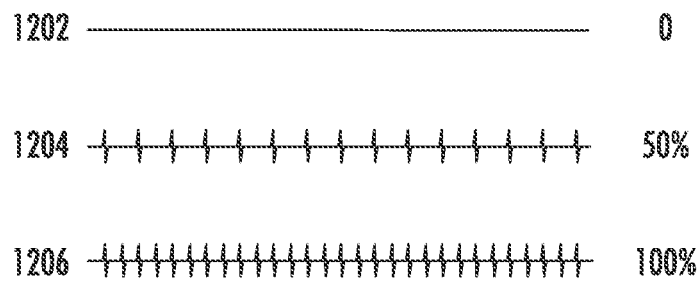
FIG. 12 is a plot illustrating use of rate base coding for communicating classification data, in accordance with one or more implementations.

One exemplary realization of the rate code approach is illustrated in FIG. 12, where traces 1202, 1204, 1206 depict output activity of the classifier (e.g., the neuron 140). By way of a non-limiting example, trace 1206 may depict output being generated at a maximum attainable rate for the neuron, which may indicate high classification probability value being outputted. In some implementations of a deterministic neuron process, the maximum rate may correspond to the neuron generating an output (e.g., a spike) at network update time step in a discrete time simulation. In some implementations of stochastic neuron process, the maximum rate may correspond to the neuron generating an output with a probability of one or close to one at a network update time step in a discrete time simulation. Absence of the neuron output (as shown in the trace 1202) may communicate a probability of 0. The trace 1204 depicts output being generated every other time step (for the deterministic process) and/or with a probability of 0.5 for the stochastic neuron process). The output shown in the trace 1204 may communicate the value of 50% (e.g., classification probability of 0.5).

In some implementations, the classification probability being communicated via latency encoding may be transformed using, for example, a logarithm function, an exponential function, a temporal difference, and/or other function configured to convert original distribution of the classification probability into a more even (uniform) distribution.

Figure 13:
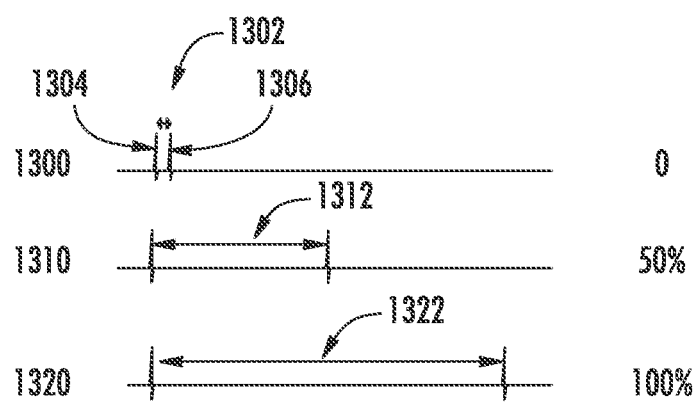
FIG. 13 is a plot illustrating use of latency coding for communicating classification data, in accordance with one or more implementations.

In one or more implementations, the data communication in and/or by the classifier network (e.g., the network 100, 300, 400, of FIGS. 1A, 3, 4, respectively) may be effectuated using a latency code approach where the time interval between successive spikes may be used to encode the communicated value. Traces 1300, 1310, 1320 in FIG. 13 illustrate an exemplary realization of latency coding configured to communicate classification probability of 0%, 50%, and 100%, respectively. In some implementations, a starter spike (e.g., 1304 in FIG. 13) may indicate the reference of the latency code. In one or more implementations, the latency code may be referenced to an event. Examples of the event may include one or more of an external signal, a trigger, a timer alarm, and/or another event. One or more spikes (e.g., the spike 1306) may be generated by the neuron. Time interval 1302 between the reference 1302 and individual spikes (e.g., 1306) may be configured based on the value being communicated. By way of illustration, when operating with a motor controller refreshed at 25 Hz, a short (e.g., less than 5 ms) interval 1302 shown in FIG. 13 may indicate classification probability that is close to zero. A long (e.g., 20 ms) time interval 1322 may be used to encode the probability of 1. An intermediate time interval (e.g., 10 ms) may be used to encode classification probability of 0.5. The latency code of FIG. 13 may utilize fewer spikes compared to the rate coding of FIG. 12. Utilizing fewer spikes may result in reduced energy use, communication load, and/or computational load on the neuromorphic processing systems (e.g., described in detail below with respect to FIGS. 11A-11D). It will be appreciated by those skilled in the arts that above interval values are exemplary and will be configured in accordance with a specific application. For example, the interval values may be configured based on a desired response time of the robotic motor system, and/or a timeout in a person identification application.

Figure 14:
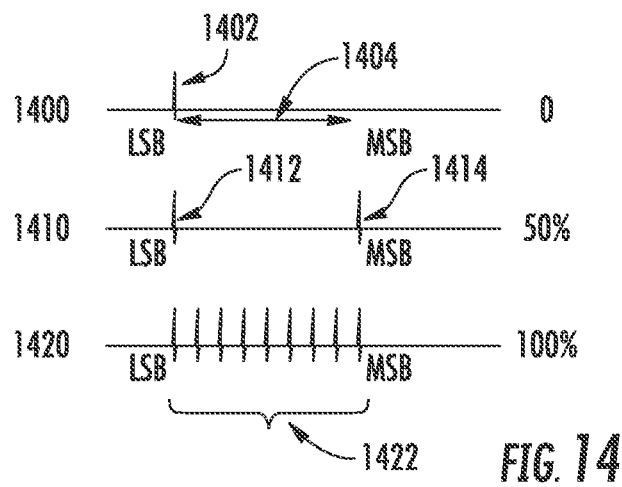
FIG. 14 is a plot illustrating use of base-n coding for communicating classification data, in accordance with one or more implementations.

In some implementations, data communication in and/or by the classifier network (e.g., the network 100, 300, 400, of FIGS. 1A, 3, 4, respectively) may employ base-n code approach, based on the use spikes in order to represent components in an n-ary number representation (e.g., bits of a binary number). The traces 140, 1410, 1420 in FIG. 14 illustrate one exemplary realization of latency coding configured to communicate classification probability of 0%, 50%, and 100%, respectively. In one or more implementations, the base-2 code approach may utilize cyclic (e.g., periodic at 1-ms interval) network updates in order to represent bits of a binary number within a symbol duration 1404. The trace 1400 may comprise a single bit 1402 (also referred to as the least significant bit (LSB) and/or start bit) within the symbol interval 1404, which may correspond to encoding of zero classification probability. The trace 1410 may comprise two bits: the LSB 1412 and most significant bit (MSB) 1414 (also may be referred to as the stop bit) within the symbol interval 1404. The data pattern on trace 1410 may be used to encode a 50% probability of classification (e.g., the response "not sure"). The trace 1420 may comprise a plurality of bits 1422 within the symbol interval 1404, corresponding to encoding of classification probability of (or close to) 100%. In one or more implementations of base-n coding, synchronization between input and output neuron may be achieved by a start spike and/or by a shared timing signal (not shown). In one or more implementations, a linear encoding and/or a logarithmic encoding may be used in order to represent the communicated value as spikes of the spike group 1422.

It will be appreciated by those skilled in the arts that the above base-n encoding representation provides an exemplary illustration and other coding mechanisms may be used. In one or more implementation, various error-correcting approaches may be applied, including but not limited to, repetition coding, bit reordering, Gray coding, block codes (e.g., Reed-Solomon, Golay, BCH, Hamming, and/or other block codes), convolutional codes (e.g., employing a Viterbi algorithm), concatenated codes, low-density parity check codes, turbo codes, and/or other coding mechanisms.

The neurons of the input layer, subset layer and aggregation layer (e.g., the neurons 102, 104, 106, 112, 114, 116 122, 124, 126, 128, 132, 134, 136, 138, 140 in FIG. 1A and/or the neurons 422, 424, 426, 428 in FIG. 4) may be operated in accordance with a deterministic neuron process characterized by deterministic delivery to a post-synaptic neuron(s) of spikes, generated by pre-synaptic neuron(s).

In one or more implementations, all or a portion of the neurons of the classifier network may be operable in accordance with a stochastic process characterized by a loss (drop out) of one or more spikes generated by pre-synaptic neuron(s). In one or more implementations the stochastic process of the subset neuron layer (e.g., the layers 120, 130 in FIG. 1A) may comprise a stochastic threshold configured to cause response generation by the neurons based on a comparison of the neuron state and the threshold. For instance, the neuron may spike with some probability based on the distance between the neuron state and the threshold. In one implementation, the neuron response may be characterized by a response probability. By way of non-limiting example, a neuron probability response no less that 0.5 may correspond to the neuron generating response (active neuron), while a neuron probability response below 0.5 may correspond to the neuron remaining inactive. Determinism and/or non-linearity may be enhanced in the stochastic case by using redundant input. For instance, the value of a given feature may be encoded by multiple neurons (e.g., three, so that the stochastic failure of any single neuron to spike no effect on the system.

Figure 5A:
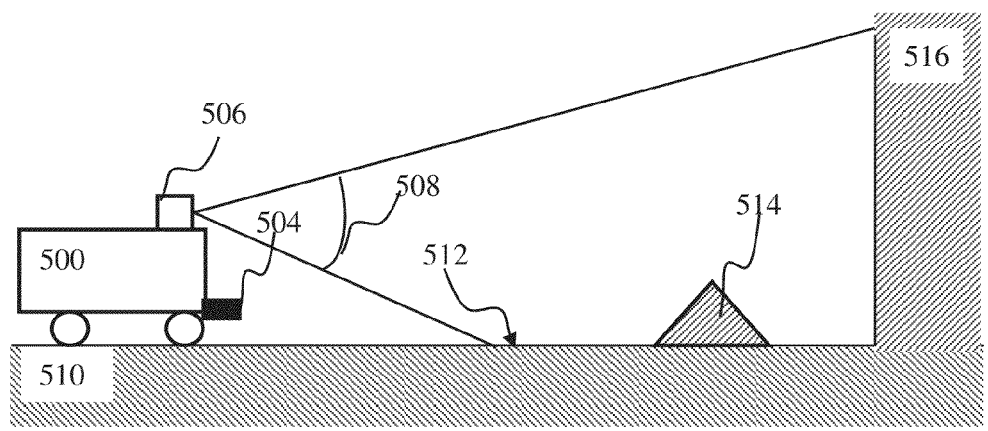
FIG. 5A is a graphical illustration depicting object detection by a robotic device block using visual imaging, in accordance with one or more implementations.

FIG. 5A illustrates a robotic apparatus comprising a classification apparatus of the disclosure, in accordance with one or more implementations. A mobile robotic apparatus 500 may comprise a camera 506. The mobile robotic apparatus may be a rover. The camera 506 may be characterized by a field of view 508. The camera 506 may provide information associated with objects and/or rover surroundings within the field-of-view. In some implementations, the camera 506 may provide frames of pixels of luminance, such as the frames 602, 604 shown in FIG. 6A, described below. The frames may be refreshed at 25 Hz frame rate.

One or more objects may be present in the camera field of view. Examples of such objects may include one or more of a wall 516, a portion 512 of the floor, an object 514, and/or other objects. In some implementations, the objects 516, 514 may be regarded as obstacles for the rover. The content of the images frames acquired with the camera 506 may be classified using one or more methodologies described herein. In one or more implementations, the robotic device 500 may comprise a sensor 504 configured to provide input to a classification apparatus during training. The sensor may comprise a proximity sensor, a touch sensor, and/or other sensors that may inform the robotic device of presence of obstacles (e.g., the objects 514, 516 in FIG. 5A) in its path.

Figure 5B:
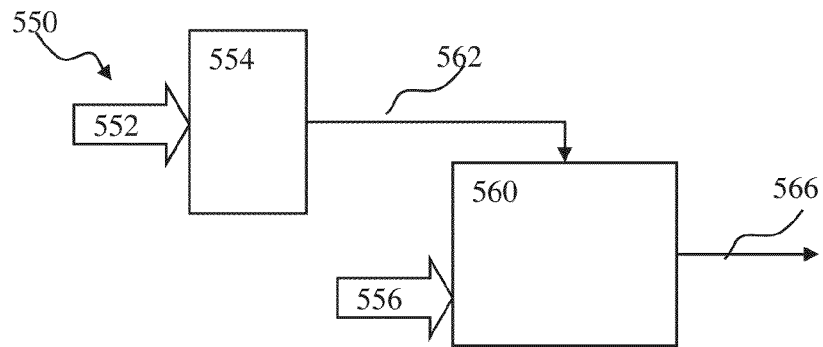
FIG. 5B is a block diagram illustrating a classifier apparatus configured to process visual imaging data in a robotic device of FIG. 5A, in accordance with one or more implementations.

FIG. 5B presents a block diagram of a spiking neuron classifier apparatus 550, in accordance with one or more implementations. By way of non-limiting example, the spiking neuron classifier apparatus 550 may be used for obstacle detection by the robotic apparatus 500 of FIG. 5A. The classifier apparatus 550 may comprise a pre-processor block 154 configured to extract one or more features (e.g., the features 202, 204, 206 in FIG. 2) within the input 552. In one or more implementations, the input 552 may comprise a pixel stream generated by the camera 506 of FIG. 5A. In some implementations, the input 552 may comprise two or more frames of pixels, such as the frames 602, 604, 606 described with respect to FIG. 6A below. The pre-processing block 554 may provide encoded feature set output 562 to the classification block 560. The output 562 may correspond, in one or more implementations, to the feature sensory input 101, 401 of FIGS. 1A-1B, 4, respectively.

The classifier may comprise a spiking neuron network (e.g., the network 100, 300, 400 of FIGS. 1A, 3, 4, respectively) configured to effectuate classification using conditionally independent subsets. During training, the classifier block 560 may receive an external reference input 556 (e.g., the input 162, 164 in FIG. 1B). In one or more implementations where the classifier may be configured to determine whether an object and/or an obstacle (e.g., a wall 516) is present in a portion of the image, the reference input 556 may correspond to an output of the sensor 504.

During operation, the classifier output 566 may be provided to a control block (not shown) in order to, for example, implement obstacle/collision avoidance protocol.

Figure 6A:
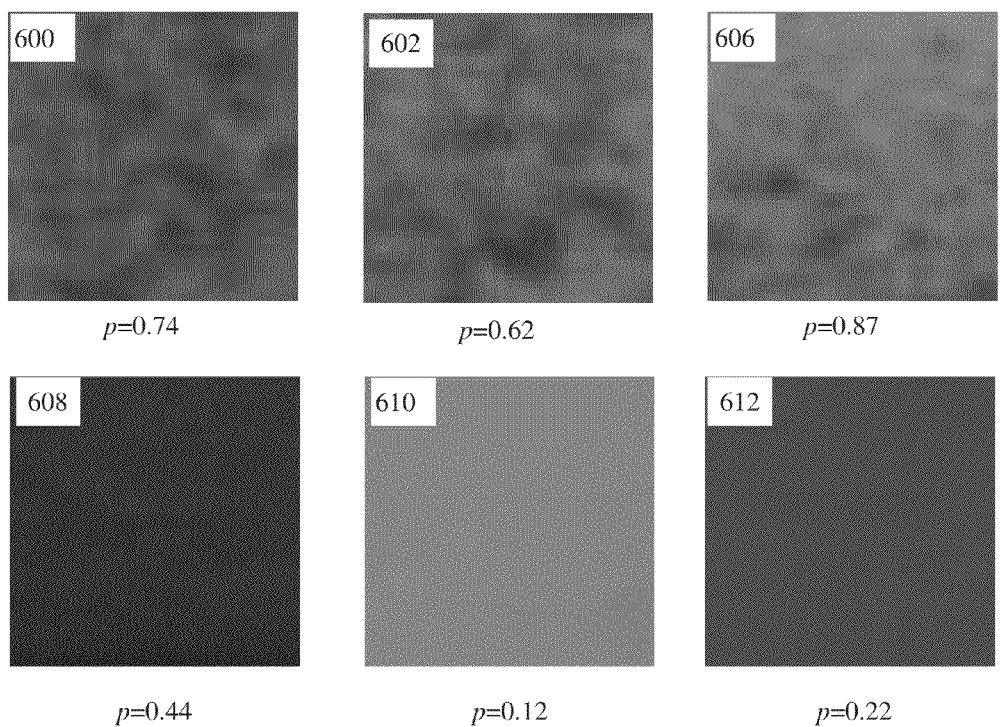
FIG. 6A is a plot illustrating training set for use with the classifier networks of FIGS. 1A, 2B, 3, 4, in accordance with one or more implementations.
Figure 6B:
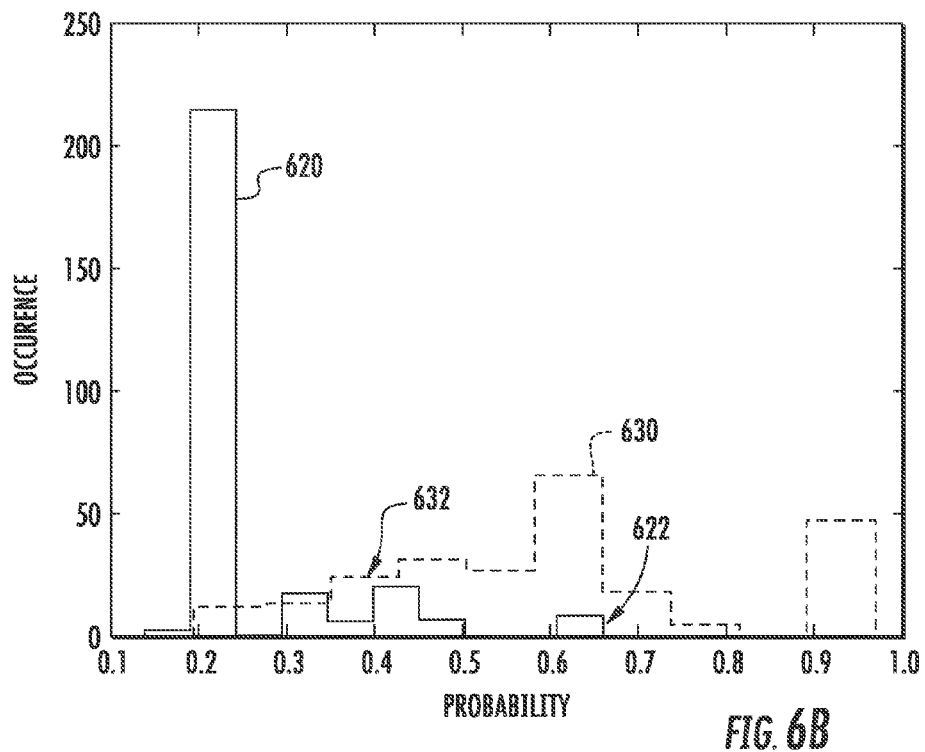
FIG. 6B is a plot presenting classification probabilities obtained by a spiking neuron network of FIG. 1A, in accordance with one or more implementations.

FIGS. 6A-6B present exemplary performance results obtained during simulation and testing performed by the Assignee hereof of exemplary computerized spiking network apparatus configured to implement discrete binary data classifier described above with respect to FIG. 4.

The results illustrated in FIGS. 6A-6B correspond to floor classification task that may be performed, for example, by the robotic device 500 of FIG. 5A. In one or more implementations, the classifier block (e.g., the block 550 of FIG. 5B) may indicate images and/or image portions corresponding to the floor. In this realization, the classifier is configured to determine if the input frame is the floor so that a positive outcome ('YES') corresponds to the presence of the floor while negative output ('NO') corresponds to absence of the floor. While data shown in FIGS. 6A-6B were obtained using an offline classification approach, online learning may be readily effectuated using the methodology described herein.

FIG. 6A presents exemplary image frames corresponding to the 'floor' category (the frames 602, 604, 606) and to corresponding to the "not floor" category (608, 610, 612).

In one or more implementation, the classifier (e.g., the block 560 of FIG. 5B) may be configured as a texture classifier. The texture classification may be aided by the presence of multiple small scale (compared to the frame size) distinguishable features that may differ between the floor and non-floor texture. In one or more implementations, the floor texture may correspond to the pattern of the carpet, parent of wood planks, and/or blacktop pattern. In one or more implementations, local binary pattern approach may be applied in order to extract features (e.g., the bit patterns 202, 204, 206 in FIG. 2). The resulting feature vector (e.g., the sensory input 101, 401 in FIGS. 1A, 4 respectively) may be represented as a normalized histogram of the occurrence of local bit patterns. An image processing library may be used to extract a feature description from the greyscale and/or a color version of the image. A non-limiting example of an image processing library may include the Mahotas Image Processing Library for Python (see, http://pypi.python.org/pypi/mahotas). In one or more implementations, sensory input 101, 401 into the spiking network classifier (e.g., the network 100, 300, 400 of FIGS. 1A, 3, 4, respectively) may comprise a spiking signal. The sensory input 101 may be generated using a higher-dimensional binary feature description by comparing different entries (e.g., comparing one entry with its neighbor) in the local bit pattern histogram. In one or more implementations, the resulting sensory input 101, 401 into the spiking network classifier may be of length 41 (meaning there are 41 input neurons) binary vector descriptor of each image (e.g., the images in FIG. 6A).

Figure 6C:
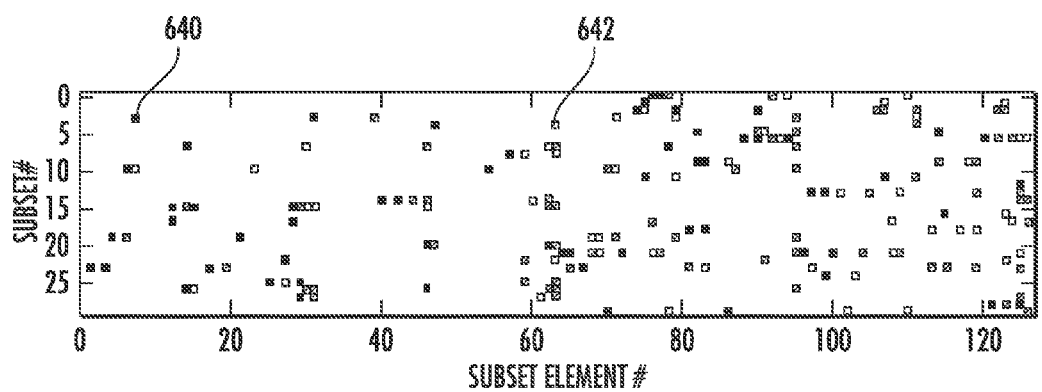
FIG. 6C is a plot illustrating learning by subset layers of the classifier of FIG. 1A, in accordance with one or more implementations.
Figure 7:
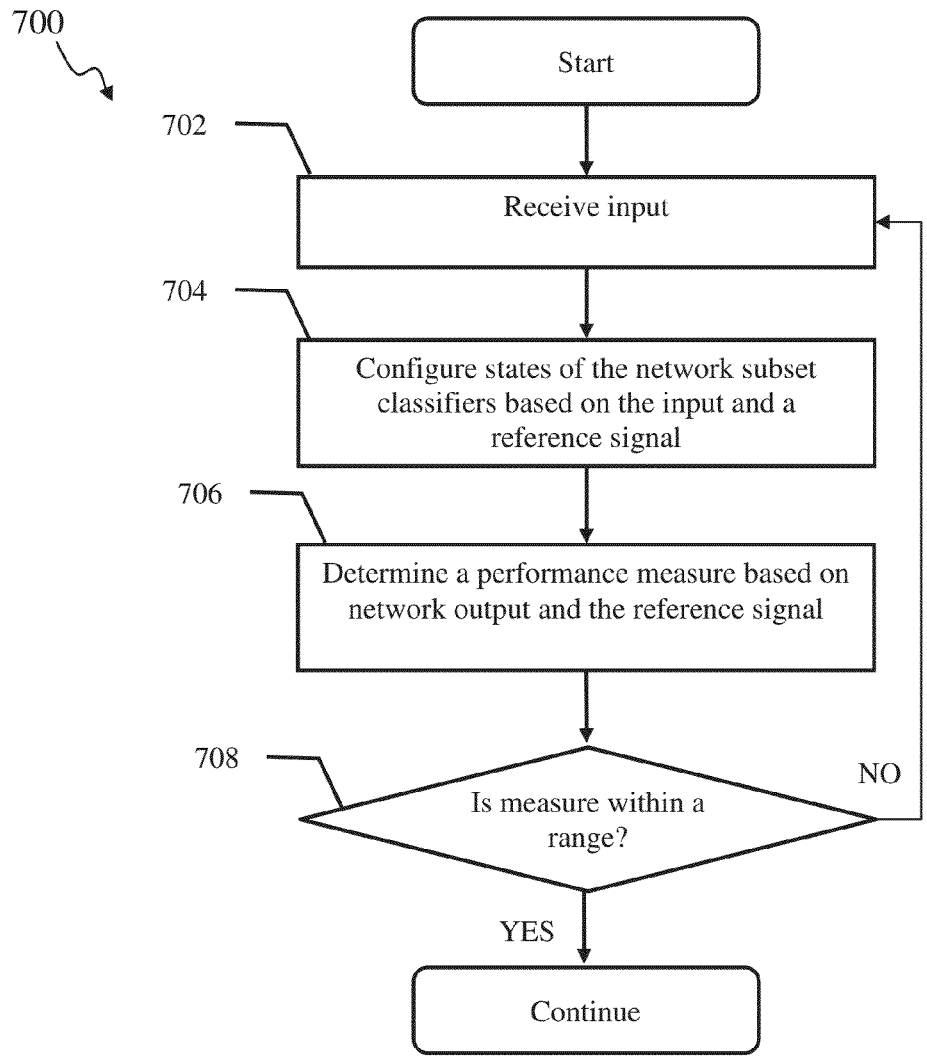
FIG. 7 is a logical flow diagram illustrating a method of training a spiking neuron network classifier, in accordance with one or more implementations.

The data presented in FIGS. 6A-6C were obtained using the following network configuration:
M=30 subsets (e.g., neuron layers 120, 130 in FIG. 1A);
K=7 neurons per subset;
41 neurons in the input layer; and
network size of approximately 4000 neurons ($2^7$=128 neurons per subset, 3840 (for 30 subsets)+41 input neurons, 41 inverting neurons and 1 output neuron=3923) and 8000 synapses (two synapses per fern neuron=3840*2+ one synapse input neuron=41 for a total of 7721).

During testing by the Assignee, the accuracy of the classifier has been evaluated using 10-fold cross-validation. In one or more implementations, the training feature set for the classifier apparatus may comprise 270 elements and the test feature set may comprise 30 elements. The test generated classification accuracy of 91.5%, in accordance with one implementation. This consisted of 148 floor examples and 184 non-floor examples. Individual cross-validation 14 floor examples and 18 non-floor examples were used for testing, the remainder were used for training).

In one or more implementations, the classifier performance may be improved and/or the network resources requirements reduced by training with a larger set, tuning of model size, feature selection, and/or an optimized learning rule. An optimized learning rule may vary depending on the problem (e.g., minimizing the squared error will be optimum for a linear example with Gaussian noise). In some implementations, color information may be utilized during feature selection. In one or more implementations, the reduction of the network resources requirements may comprise reduction of the number of neurons and/or synapses.

FIG. 6B is a plot presenting classification probabilities obtained by a spiking neuron network of FIG. 1A, in accordance with one or more implementations. The solid curve 620 and the broken curve 630 respectively depict distributions (histogram) of negative (e.g., 'NOT FLOOR') and positive ('FLOOR') output of classifier (e.g., of FIG. 1A) processing image frames (e.g., of FIG. 6A). Data shown in FIG. 6B illustrate that the spiking network classifier comprising conditionally independent subsets is capable of correctly classifying image frames and detect floor with accuracy of 97%.

FIG. 6C is a plot illustrating learning by subset layers of the classifier (e.g., the layers 120, 130 of FIG. 1A), in accordance with one or more implementations. The plot in FIG. 6C demonstrates learning by individual neurons of subset layers (shown by rows in FIG. 6C), as depicted by black (640) and white (642) squares in individual rows.

The results described with respect to FIGS. 6A-6C indicate that the classifier of the disclosure comprising conditionally independent feature subsets operable using randomly selected features is capable of providing classification accuracy that is comparable with or better than accuracy achieved with a more computationally demanding classifier of the prior art (e.g., a classifier comprising linear feature selection, semi-supervised discriminate analysis, and a tuned kernel support vector machine). Moreover, such prior art classifier approach may not be suitable for spiking neuron network implementation, due to the need to integrate non-local information during the computation and/or retain training examples.

In one or more implementations, the classifier implementation described above may be utilized with a network hierarchy configured to extract local features from the underlying image intensities directly. For example, image intensities may be encoded using the spike encodings discussed above. A second layer may determine local binary patterns and communicate these to a histogram layer. The local binary patterns may be communicated using a spiking encoding, in some implementations. A final binearizing layer may receive the encoded output of the histogram layer to perform the binary comparisons, which may be used as input to the classifier.

In one or more implementations, it may be beneficial to classify multiple inputs simultaneously. An example of such implementations may include image scanning. In some implementations, it may be desired to determine the presence of an object in multiple regions of an image without the need for localizing it to specific region (e.g., determine if there is an obstacle anywhere in this image). Implementations of the spiking neuron classifier approach of the disclosure may be utilized in order to implement a parallel classifier configured to process multiple input features (101 in FIG. 1A) simultaneously with a single classifier without an increase in latency or neural machinery. Input from individual input banks may be used to drive the classifier simultaneously. The output of the parallel classifier may comprise contributions associated with individual inputs. In one or more implementations, a modified aggregation rule may be used for the aggregation layer (e.g., the neuron 140 of FIG. 1A). By way of example, the modified aggregation rule may be configured such that a spike on any of the inputs into the neuron 140 may be interpreted as an indication of the target object present in the input.

In one or more implementations, the spiking neuron network classification approach comprising conditionally independent subsets may be utilized with higher order space inputs characterized n-ary (n>2) representations. One or more such implementations may be useful for classifying inputs comprising multiple categories. By way of a non-limiting example, a multi-category classifier useful for identifying ripe fruit in imagery of an orchard may be configured to respond to a question: "What type of fruit is present in the image (e.g., APPLE, ORANGE, PEACH or NONE)?". The multi-category classifier may comprise a learning rule configured based on a feedback from the output neuron (e.g., the neuron 140 in FIG. 1A) that explicitly modeled multiple categories. For example, the learning rules may use a maximum likelihood for multiple objects. Such a multi-category classifier may utilize the general framework illustrated, for example, in FIGS. 1A, 3, 4 with additional feedback synapses and/or additional memory to store learning parameters for the additional categories (e.g., color).

FIGS. 7-10 illustrate exemplary methods 700, 800, 900, 1000 of training and operating a classifier network (e.g., the networks 100, 160, 300, 400 of FIGS. 1A-1B, 3, 4, respectively), in accordance with one or more implementations. The operations of methods 700, 800, 900, 1000 presented below are intended to be illustrative. In some implementations, methods 700, 800, 900, 1000 may be accomplished with one or more additional operations not described, and/or without one or more of the operations discussed. Additionally, the order in which the operations of methods 700, 800, 900, 1000 are illustrated in FIGS. 7-10 and described below is not intended to be limiting.

In some implementations, methods 700, 800, 900, 1000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 700, 800, 900, 1000 in response to instructions stored electronically on an electronic storage medium. The one or more processing devices may include one or more devices configured through hardware, firmware, and/or software to be specifically designed for execution of one or more of the operations of methods 700, 800, 900, 1000.

Returning now to FIG. 7, a method of training classifier network is described. At an operation 702 an input may be received by the classifier network. In one or more implementations, the input may correspond to the sensory input 101 of FIG. 1A, and or frame input 602 of FIG. 6A.

At an operation 704, a network state may be updated in accordance with the input and a reference signal. In one or more implementations, the reference signal may correspond to the training signal 162, 164 (e.g., 'YES', 'NO'). In one or more implementations, where the classification may be implemented in the neurons of the subset layer (e.g., the layers 120, 130 of FIG. 1A) the network state update may comprise update of the states of the neurons (e.g., the neurons 122, 124, 126, 128, 132, 134, 136, 138 in FIG. 1A). In one or more implementations, where the classification may be implemented in the connections between the subset layer neurons (e.g., the layers 420, 430 of FIG. 4), the network state update may comprise an update of the states of the connections (e.g., the connections 144 in FIG. 4).

At an operation 706 a measure based on the network classification output (e.g., the output 142 in FIG. 1B) and the reference signal (e.g., 162, 164 in FIG. 1B) may be determined. In one or more implementations, the measure may comprise a difference or similarity between the network classification output and the reference signal. In one or more implementations, the measure may be configured based on a binary value. In one non-limiting example of the measure being configured based on a binary value, a binary ' 1' may correspond to a match and a binary '0' may correspond to a mismatch between the network classification output and the reference signal. In one or more implementations, the measure may be determined over two or more training realizations. In one or more implementations, the measure may comprise a statistical parameter determined based on an ensemble of measures associated with individual training realizations. In one or more implementations, the statistical parameter may comprise a probability (e.g., determined according to Eqn. 5-Eqn. 7) a mean, a median, and/or other parameter.

At an operation 708, the measure may be compared to a threshold. In one or more implementations, the measure may comprise a target average accuracy of classification (e.g., 90%).

When the measure is below the target value, the method may proceed to operation 702 for further training.

Figure 8:
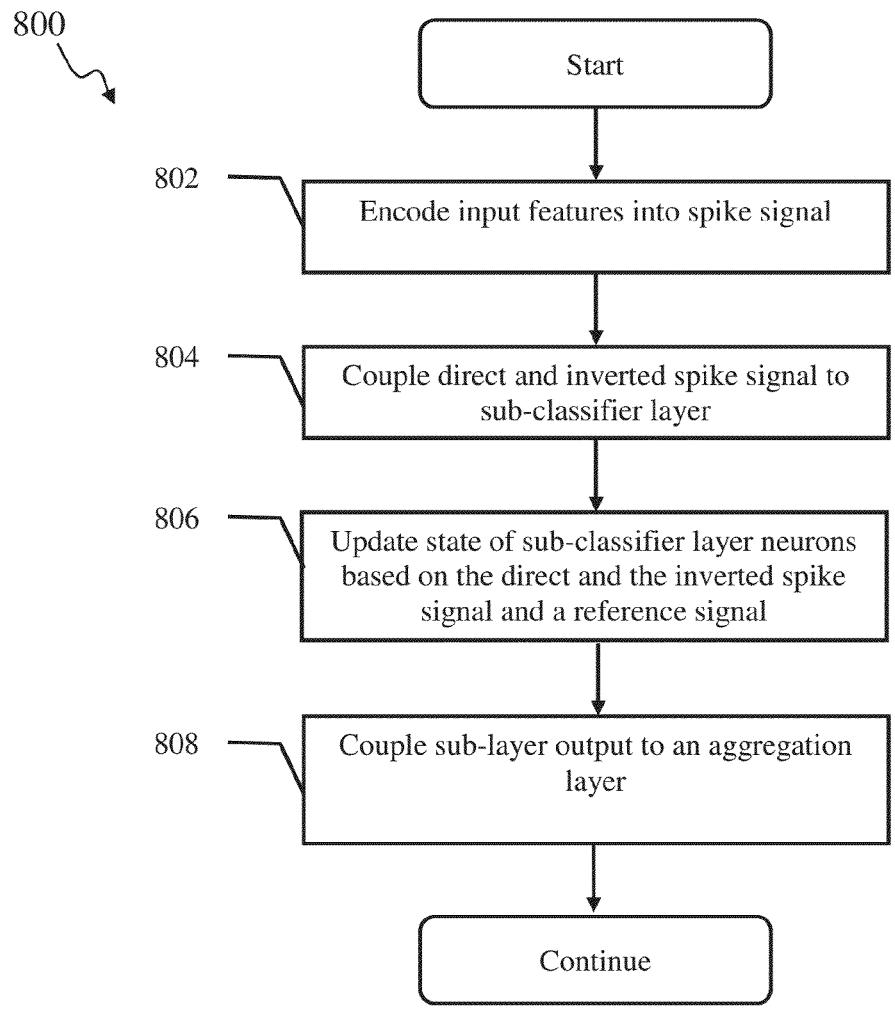
FIG. 8 is a logical flow diagram illustrating a method of operating a spiking neuron network classifier, comprising adaptable spiking neurons, in accordance with one or more implementations.

FIG. 8 illustrates operation of the classifier network (e.g., the network 100 of FIG. 1A) comprising adaptable neurons of the subset layer (e.g., the neurons 122, 124, 126, 128, 132, 124, 126, 128), in accordance with one or more implementations.

At an operation 802, an input may be encoded into a spike signal by one or more of the encoding methodologies described above. In one or more implementations, the input may correspond to the sensory input 101 of FIG. 1A, and or frame input 602 of FIG. 6. The input encoding may be performed by the input neuron layer (e.g., the layers 108, 110 of FIG. 1A or 308 of FIG. 3).

At an operation 804, a direct spike signal and/or an inverted spike signal of operation 802 may be coupled to the classifier layer (e.g., 120, 130 of FIG. 1A) comprising one or more ferns. In some implementations, the direct spike signal and the inverted spike signal may be provided by the direct and the inversion input layer (e.g., layers 120, 130 in FIG. 1A, respectively). In some implementations, the direct spike signal and the inverted spike signal may be provided from a single input layer (e.g., 308 in FIG. 3) via positive and/or inverted synapses (e.g., 319, 318 in FIG. 3, respectively).

At an operation 806, a state of the fern neurons may be updated in accordance with the direct spike signal, the inverted spike signal, and a reference signal. The reference signal may comprise a training signal (e.g., the labels) associated with one or more objects being classified by the classifier. In some implementations, the state update may be based on methodology described above with respect to Eqn. 5-Eqn. 7.

At an operation 808, sub-layer output may be coupled to an aggregation layer (e.g., the output neuron 140 of FIG. 1A or the aggregation layer comprising the neuron 440 as described with respect to FIG. 4 above). The aggregation layer may be configured to generate a classification output in accordance with, for example, Eqn. 1, Eqn. 11, and/or Eqn. 12.

Figure 9:
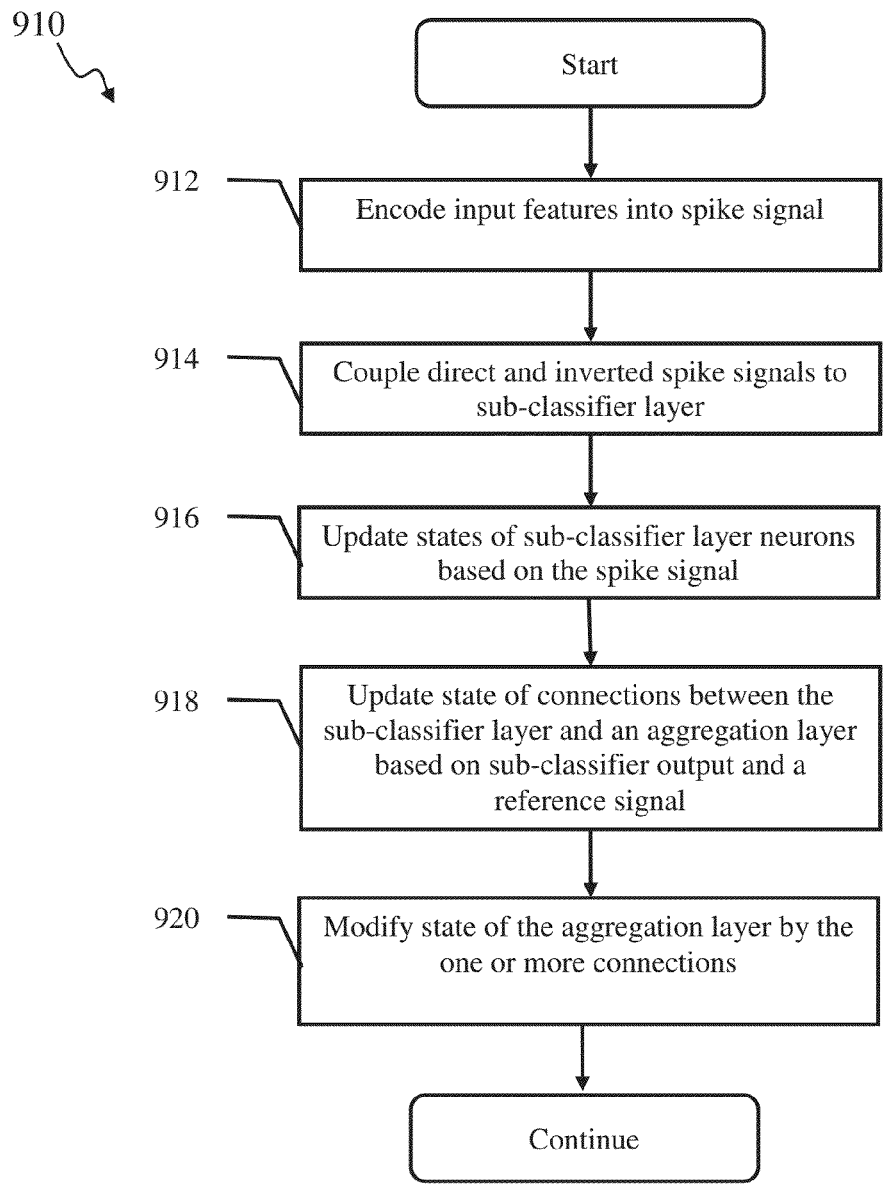
FIG. 9 is a logical flow diagram illustrating a method of operating a spiking neuron network classifier, comprising adaptable neuron connections, in accordance with one or more implementations.

FIG. 9 illustrates an operation of the classifier network comprising adaptable neuron connections (e.g., the network 400 of FIG. 4), in accordance with one or more implementations.

At an operation 912, an input may be encoded into spike signal by, for example, an encoding mechanism described in detail in co-owned and co-pending U.S. patent application Ser. No. 13/152,084 entitled APPARATUS AND METHODS FOR PULSE-CODE INVARIANT OBJECT RECOGNITION", filed Jun. 2, 2011, co-owned U.S. patent application Ser. No. 13/152,119, filed Jun. 2, 2011 and patented as U.S. Pat. No. 8,942,466 on Jan. 27, 2015, entitled "SENSORY INPUT PROCESSING APPARATUS AND METHODS", co-owned U.S. patent application Ser. No. 13/623,820 entitled "APPARATUS AND METHODS FOR ENCODING OF SENSORY DATA USING ARTIFICIAL SPIKING NEURONS", filed Sep. 20, 2012 and patented as U.S. Pat. No. 9,047,568 on Jun. 2, 2015, and co-owned U.S. Pat. No. 8,315,305, issued Nov. 20, 2012, entitled "SYSTEMS AND METHODS FOR INVARIANT PULSE LATENCY CODING", each of the foregoing being incorporated herein by reference in its entirety. In one or more implementations, the input may correspond to the feature vector 401 of FIG. 4, and/or frame input 602 of FIG. 6A. The input encoding may be performed by the input neuron layer (e.g., the layers 408, 410 of FIG. 4).

At an operation 914, a direct spike signal and/or an inverted spike signal obtained at the operation 912 may be coupled to the fern classifier layer (e.g., 420, 430 of FIG. 4) comprising one or more ferns. In some implementation, the direct spike signal and the inverted spike signal may be provided by the direct and the inversion input layer (e.g., layers 420, 430 in FIG. 4, respectively). In some implementations, the direct spike signal and the inverted spike signal may be provided from a single input layer (e.g., 408 in FIG. 3) via positive synapses and/or inverted synapses (e.g., 419, 418 in FIG. 3, respectively).

At an operation 916, a state of the fern neurons (e.g., the neurons 422, 424, 426, 428, 432, 434, 436, 438) may be updated in accordance with the direct spike signal and the inverted spike signal.

At an operation 918, a state of the connection (e.g., the connections 444 in FIG. 4) may be updated in accordance with fern neuron output and a reference signal. The fern neurons may generate the output based on the spiking input of the operation 916. The reference signal may comprise a training signal (e.g., the labels) associated with one or more objects being classified by the classifier. In some implementations, the state update may be based on one or more methodologies described in connection with Eqn. 5-Eqn. 7.

At an operation 920, a state of the aggregation layer neuron(s) (e.g., the output neuron 440 of FIG. 4 and/or relay neuron(s) described with respect to FIG. 4 above) may be modified based on the connection state. In some implementations (e.g., implementations comprising a HLND framework), the connections 444 in FIG. 4 may be configured to communicate their state parameters (e.g., classification probability) to post-synaptic units (e.g., the aggregation neuron 440 in FIG. 4). The aggregation layer may be configured to generate a classification output in accordance with, for example, Eqn. 1, Eqn. 11, and/or Eqn. 12.

Figure 10:
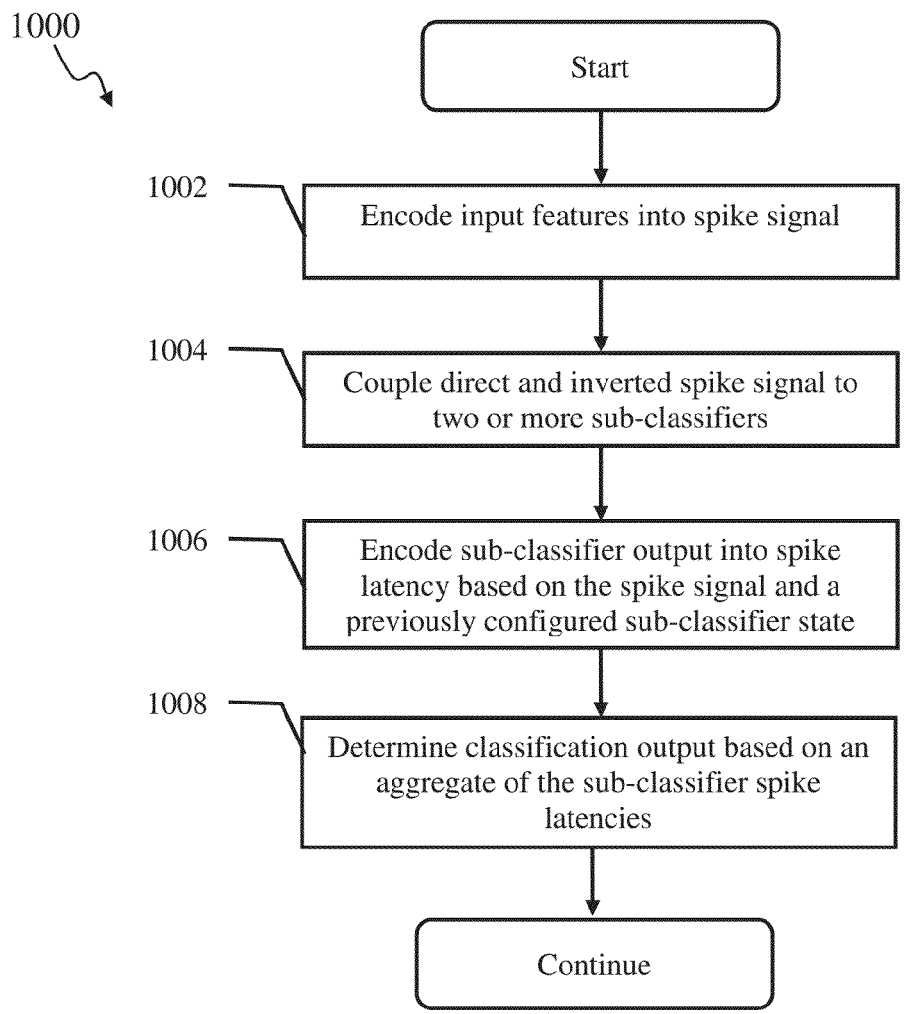
FIG. 10 is a logical flow diagram illustrating a method of operating a spiking neuron classifier comprising latency encoding, in accordance with one or more implementations.

FIG. 10 illustrates an operation of the classifier network comprising latency encoding, in accordance with one or more implementations.

At an operation 1002, an input may be encoded into a spike signal by one or more of the encoding methodologies, such as described for example, in co-owned U.S. Pat. No. 8,315,305 issued on Nov. 20, 2012, entitled "SYSTEMS AND METHODS FOR INVARIANT PULSE LATENCY CODING", which is incorporated herein by reference in its entirety. In one or more implementations, the input may correspond to the feature vector 401 of FIG. 4, and/or frame input 602 of FIG. 6A. The input encoding may be performed by the input neuron layer (e.g., the layers 408, 410 of FIG. 4).

At an operation 1004, a direct spike signal and an/or inverted spike signal obtained at operation 912 may be coupled to the fern classifier layer (e.g., 420, 430 of FIG. 4) comprising one or more ferns. In some implementation, the direct spike signal and the inverted spike signal may be provided by the direct input layer and the inversion input layer (e.g., layers 420, 430 in FIG. 4, respectively). In some implementations, the direct spike signal and the inverted spike signal may be provided from a single input layer (e.g., 408 in FIG. 3) via positive synapses and/or inverted synapses (e.g., 419, 418 in FIG. 3, respectively).

At an operation 1006, a state of the fern neurons (e.g., the neurons 422, 424, 426, 428, 432, 434, 436, 438) may be updated in accordance with the direct spike signal and the inverted spike signal.

At an operation 1008, a state of the connection (e.g., the connections 444 in FIG. 4) may be updated in accordance with fern neuron output and a reference signal. The fern neurons may generate the output based on the spiking input of the operation 916. The reference signal may comprise a training signal (e.g., the labels) associated with one or more objects being classified by the classifier. In some implementations, the state update may be based on one or more methodologies described in connection with Eqn. 5-Eqn. 7.

At an operation 920, a state of the aggregation layer neuron(s) (e.g., the output neuron 440 of FIG. 4 and/or relay neuron(s) described with respect to FIG. 4 above) may be modified based on the connection state. In some implementations (e.g., implementations comprising a HLND framework), the connections 444 in FIG. 4 may be configured to communicate their state parameters (e.g., classification probability) to post-synaptic units (e.g., the aggregation neuron 440 in FIG. 4). The aggregation layer may be configured to generate a classification output in accordance with, for example, Eqn. 1, Eqn. 11, and/or Eqn. 12.

Various exemplary spiking network apparatuses configured to perform one or more of the methods set forth herein (e.g., classifier comprising conditionally independent subsets) are now described with respect to FIGS. 11A-11D.

Figure 11A:
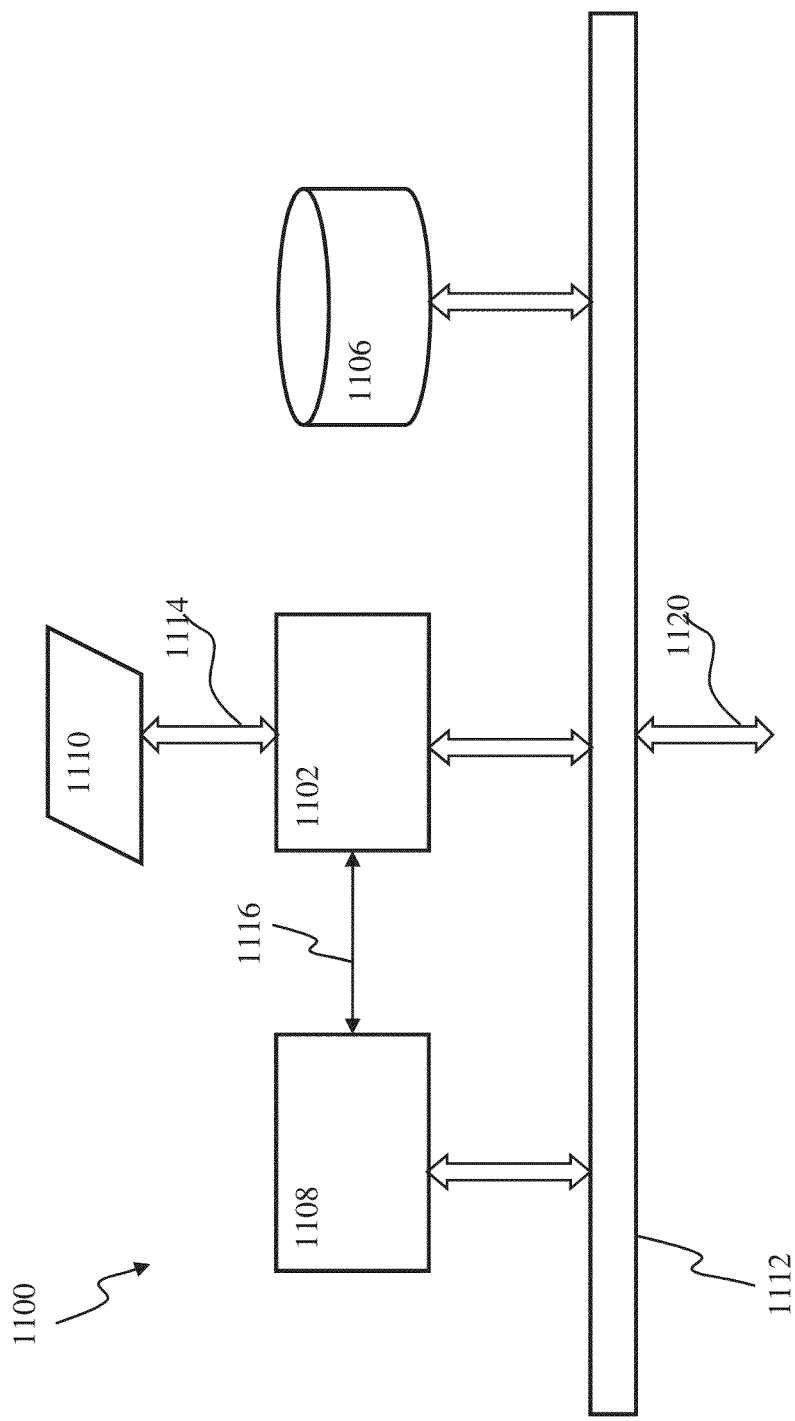
FIG. 11A is a block diagram illustrating computerized system useful for implementing classification methodology of the disclosure in a spiking neuron network, in accordance with one or more implementations.

One particular implementation of the computerized neuromorphic processing system for operating a computerized spiking network (and implementing the exemplary classification methodology described supra) is illustrated in FIG. 11A. The computerized system 1100 of FIG. 11A may comprise an input interface 1110. The input interface 1110 may include one or more of an image sensor, a computerized spiking retina, an audio array, a touch-sensitive input device, and/or other devices. The input interface 1110 may be coupled to the processing block (e.g., a single or multi-processor block) via the input communication interface 1114. The system 1100 may comprise a random access memory (RAM) 1108, configured to store neuronal states and connection parameters (e.g., weights 526 in FIG. 5), and to facilitate synaptic updates. In some implementations, synaptic updates may be performed according to the description provided in, for example, in U.S. patent application Ser. No. 13/239,255 filed Sep. 21, 2011, entitled "APPARATUS AND METHODS FOR SYNAPTIC UPDATE IN A PULSE-CODED NETWORK", incorporated herein by reference in its entirety.

In some implementations, the memory 1108 may be coupled to the processor 1102 via a direct connection 1116 (e.g., memory bus). The memory 1108 may also be coupled to the processor 1102 via a high-speed processor bus 1112.

The system 1100 may comprise a nonvolatile storage device 1106. The nonvolatile storage device 1106 may comprise, inter alia, computer readable instructions configured to implement various aspects of spiking neuronal network operation. Examples of various aspects of spiking neuronal network operation may include one or more of sensory input encoding, connection plasticity, operation model of neurons, other operations, and/or other aspects. In one or more implementations, the nonvolatile storage 1106 may be used to store state information of the neurons and connections for later use and loading previously stored network configuration. The nonvolatile storage 1106 may be used to store state information of the neurons and connections when, for example, saving and/or loading network state snapshot, implementing context switching, saving current network configuration, and/or performing other operations. The current network configuration may include one or more of connection weights, update rules, neuronal states, learning rules, and/or other parameters.

In some implementations, the computerized apparatus 1100 may be coupled to one or more of an external processing device, a storage device, an input device, and/or other devices via an I/O interface 1120. The I/O interface 1120 may include one or more of a computer I/O bus (PCI-E), wired (e.g., Ethernet) or wireless (e.g., Wi-Fi) network connection, and/or other I/O interfaces.

In some implementations, the input/output (I/O) interface may comprise a speech input (e.g., a microphone) and a speech recognition module configured to receive and recognize user commands.

It will be appreciated by those skilled in the arts that various processing devices may be used with computerized system 1100, including but not limited to, a single core/multicore CPU, DSP, FPGA, GPU, ASIC, combinations thereof, and/or other processors. Various user input/output interfaces may be similarly applicable to implementations of the invention including, for example, an LCD/LED monitor, touch-screen input and display device, speech input device, stylus, light pen, trackball, and/or other devices.

Figure 11B:
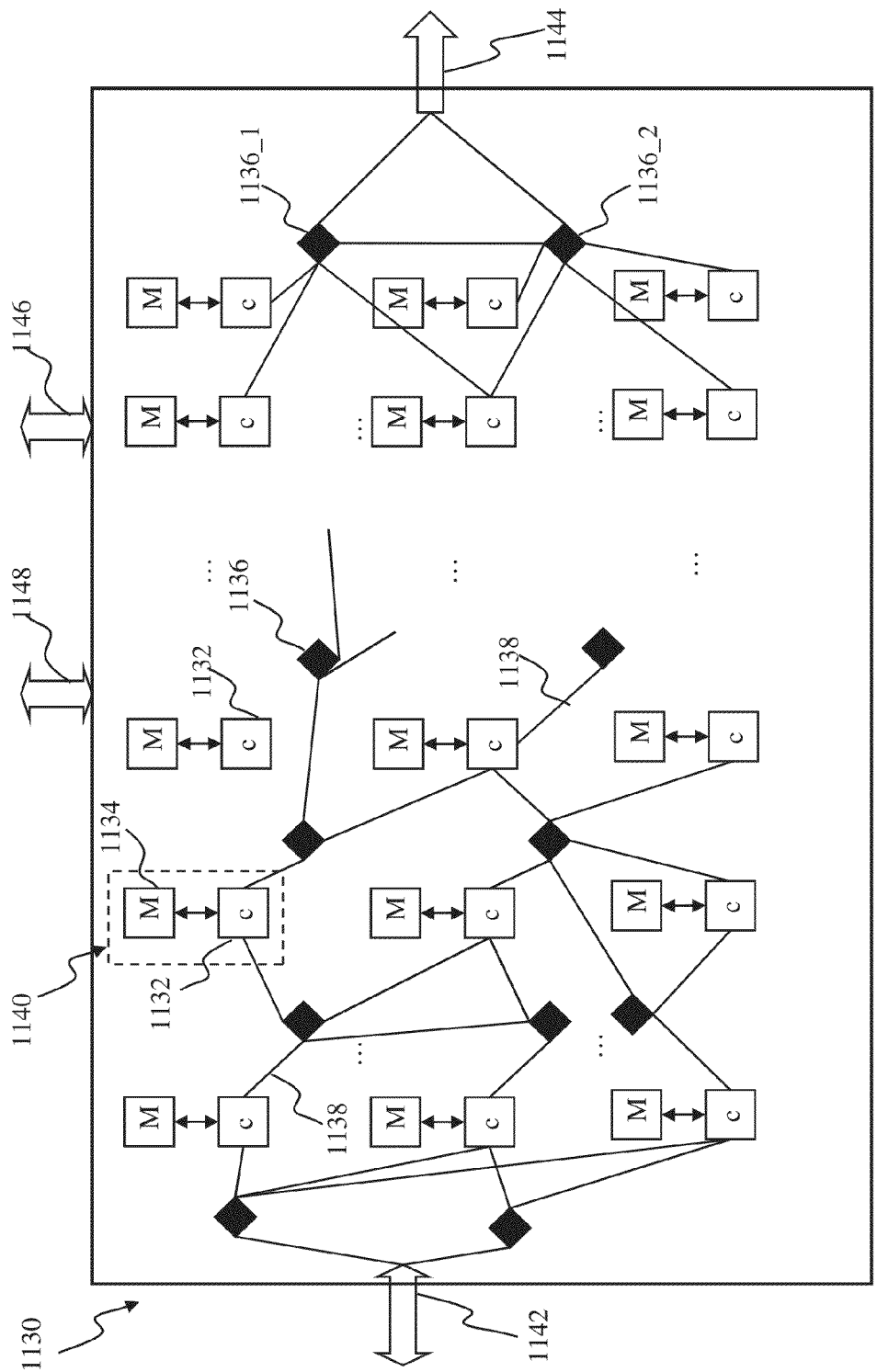
FIG. 11B is a block diagram illustrating a neuromorphic computerized system useful with the spiking neuron network classifier, in accordance with one or more implementations.

Referring now to FIG. 11B, one implementation of neuromorphic computerized system configured to implement classification mechanism using a spiking network is described in detail. The neuromorphic processing system 1130 of FIG. 11B may comprise a plurality of processing blocks (microblocks) 1140. Individual micro cores may comprise a computing logic core 1132 and a memory block 1134. The logic core 1132 may be configured to implement various aspects of neuronal node operation, such as the node model, and synaptic update rules and/or other tasks relevant to network operation. The memory block may be configured to store, inter alia, neuronal state variables and connection parameters (e.g., weights, delays, I/O mapping) of connections 1138.

The micro-blocks 1140 may be interconnected with one another using connections 1138 and routers 1136. As it is appreciated by those skilled in the arts, the connection layout in FIG. 11B is exemplary, and many other connection implementations (e.g., one to all, all to all, and/or other maps) are compatible with the disclosure.

The neuromorphic apparatus 1130 may be configured to receive input (e.g., visual input) via the interface 1142. In one or more implementations, applicable for example to interfacing with computerized spiking retina, or image array, the apparatus 1130 may provide feedback information via the interface 1142 to facilitate encoding of the input signal.

The neuromorphic apparatus 1130 may be configured to provide output via the interface 1144. Examples of such output may include one or more of an indication of recognized object or a feature, a motor command (e.g., to zoom/pan the image array), and/or other outputs.

The apparatus 1130, in one or more implementations, may interface to external fast response memory (e.g., RAM) via high bandwidth memory interface 1148, thereby enabling storage of intermediate network operational parameters. Examples of intermediate network operational parameters may include one or more of spike timing, neuron state, and/or other parameters. The apparatus 1130 may interface to external memory via lower bandwidth memory interface 1146 to facilitate one or more of program loading, operational mode changes, retargeting, and/or other operations. Network node and connection information for a current task may be saved for future use and flushed. Previously stored network configuration may be loaded in place of the network node and connection information for the current task. External memory may include one or more of a Flash drive, a magnetic drive, and/or other external memory.

Figure 11C:
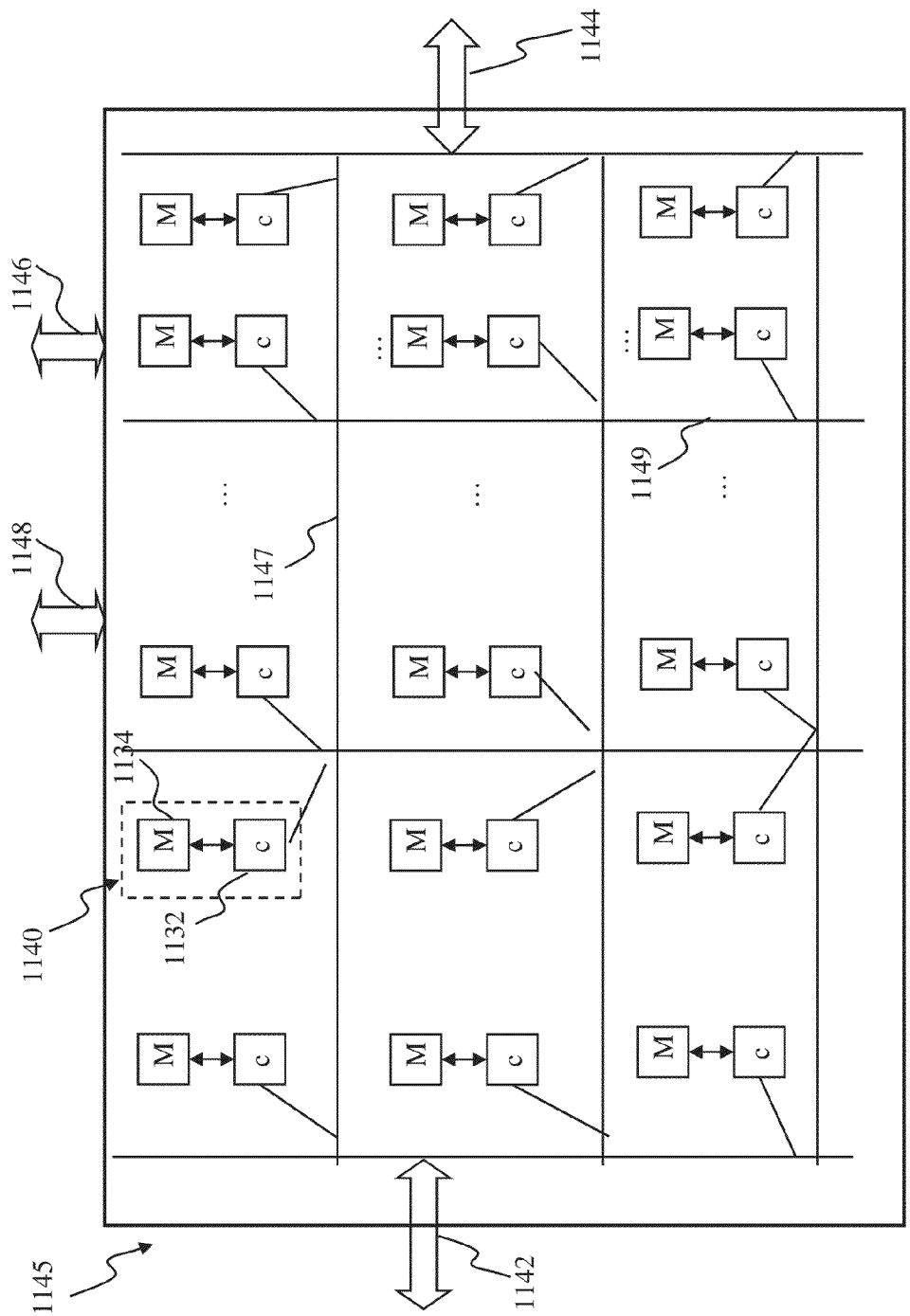
FIG. 11C is a block diagram illustrating a hierarchical neuromorphic computerized system architecture useful with the spiking neuron network classifier, in accordance with one or more implementations.

FIG. 11C illustrates one or more implementations of shared bus neuromorphic computerized system 1145 comprising micro-blocks 1140, described with respect to FIG. 11B, supra. The system 1145 of FIG. 11C may utilize shared bus 1147, 1149 to interconnect micro-blocks 1140 with one another.

Figure 11D:
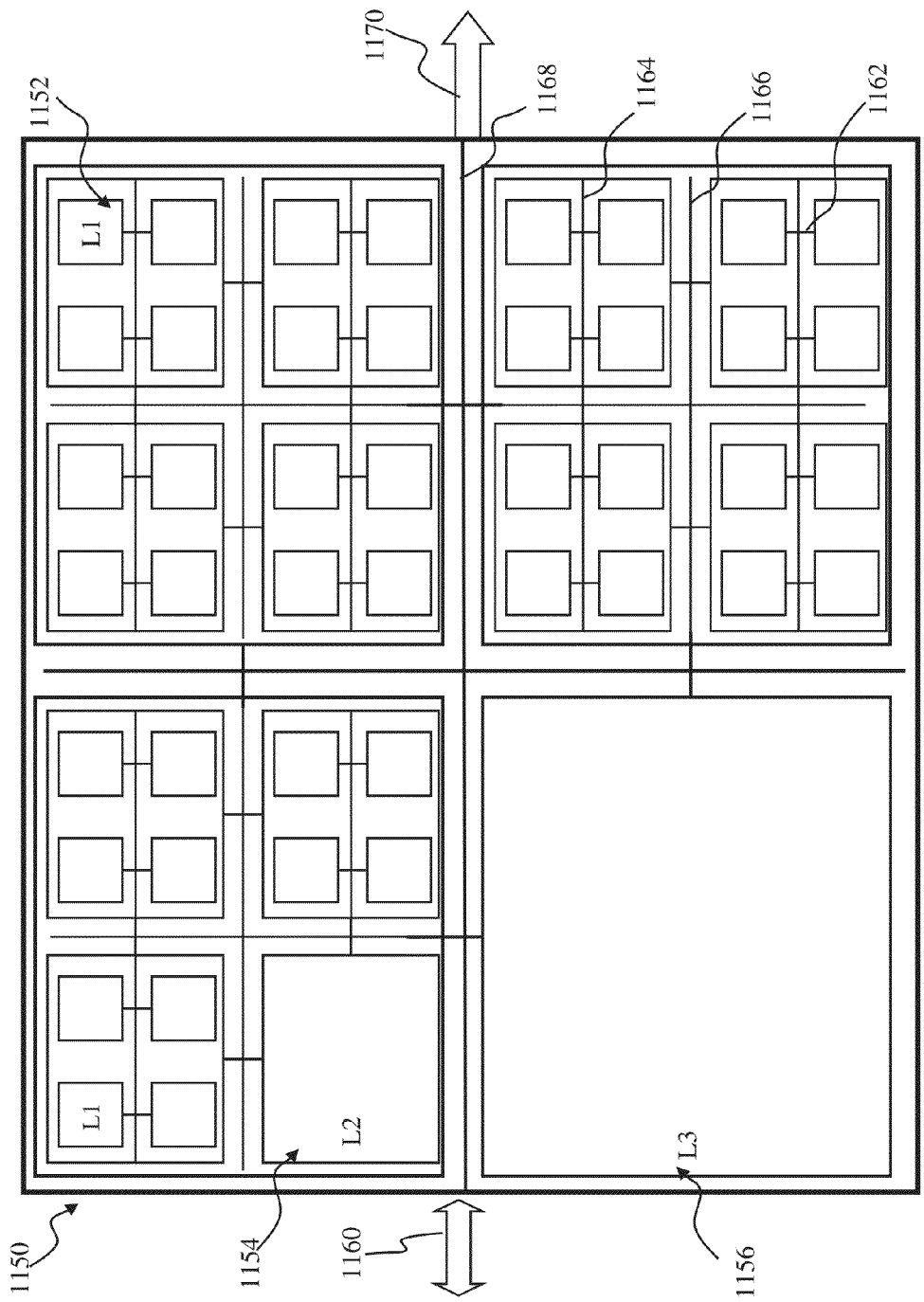
FIG. 11D is a block diagram illustrating cell-type neuromorphic computerized system architecture useful with the spiking neuron network classifier, in accordance with one or more implementations.

FIG. 11D illustrates one implementation of cell-based neuromorphic computerized system architecture configured to optical flow encoding mechanism in a spiking network is described in detail. The neuromorphic system 1150 may comprise a hierarchy of processing blocks (cells blocks). In some implementations, the lowest level L1 cell 1152 of the apparatus 1150 may comprise logic and memory blocks. The lowest level L1 cell 1152 of the apparatus 1150 may be configured similar to the micro block 1140 of the apparatus shown in FIG. 11B. A number of cell blocks may be arranged in a cluster and may communicate with one another via local interconnects 1162, 1164. Individual clusters may form higher level cell, e.g., cell L2, denoted as 1154 in FIG. 11*d*. Similarly, several L2 clusters may communicate with one another via a second level interconnect 1166 and form a super-cluster L3, denoted as 1156 in FIG. 11D. The super-clusters 1154 may communicate via a third level interconnect 1168 and may form a next level cluster. It will be appreciated by those skilled in the arts that the hierarchical structure of the apparatus 1150, comprising four cells-per-level, is merely one exemplary implementation, and other implementations may comprise more or fewer cells per level, and/or fewer or more levels.

Different cell levels (e.g., L1, L2, L3) of the apparatus 1150 may be configured to perform functionality various levels of complexity. In some implementations, different L1 cells may process in parallel different portions of the visual input (e.g., encode different pixel blocks, and/or encode motion signal), with the L2, L3 cells performing progressively higher level functionality (e.g., object detection). Different ones of L2, L3, cells may perform different aspects of operating a robot with one or more L2/L3 cells processing visual data from a camera, and other L2/L3 cells operating motor control block for implementing lens motion what tracking an object or performing lens stabilization functions.

The neuromorphic apparatus 1150 may receive input (e.g., visual input) via the interface 1160. In one or more implementations, applicable for example to interfacing with computerized spiking retina, or image array, the apparatus 1150 may provide feedback information via the interface 1160 to facilitate encoding of the input signal.

The neuromorphic apparatus 1150 may provide output via the interface 1170. The output may include one or more of an indication of recognized object or a feature, a motor command, a command to zoom/pan the image array, and/or other outputs. In some implementations, the apparatus 1150 may perform all of the I/O functionality using single I/O block (not shown).

The apparatus 1150, in one or more implementations, may interface to external fast response memory (e.g., RAM) via a high bandwidth memory interface (not shown), thereby enabling storage of intermediate network operational parameters (e.g., spike timing, neuron state, and/or other parameters). In one or more implementations, the apparatus 1150 may interface to external memory via a lower bandwidth memory interface (not shown) to facilitate program loading, operational mode changes, retargeting, and/or other operations. Network node and connection information for a current task may be saved for future use and flushed. Previously stored network configuration may be loaded in place of the network node and connection information for the current task.

In one or more implementations, networks of the apparatus 1130, 1145, 1150 may be implemented using Elementary Network Description (END) language, described for example in U.S. patent application Ser. No. 13/239,123, entitled "ELEMENTARY NETWORK DESCRIPTION FOR NEUROMORPHIC SYSTEMS WITH PLURALITY OF DOUBLETS WHEREIN DOUBLET EVENTS RULES ARE EXECUTED IN PARALLEL". filed Sep. 21, 2011, and/or High Level Neuromorphic Description (HLND) framework, described for example in U.S. patent application Ser. No. 13/385,938, entitled "TAG-BASED APPARATUS AND METHODS FOR NEURAL NETWORKS". filed Mar. 15, 2012 and patented as U.S. Pat. No. 8,712,939 on Apr. 29, 2014, each of the foregoing incorporated supra. In one or more implementations, the HLND framework may be augmented to handle event based update methodology described in, for example, co-pending U.S. patent application Ser. No. 13/588,774, entitled "APPARATUS AND METHODS FOR IMPLEMENTING EVENT-BASED UPDATES IN SPIKING NEURON NETWORK". filed Aug. 17, 2012, the foregoing being incorporated herein by reference in its entirety. In some implementations, the networks may be updated using an efficient network update methodology, described in, for example, in U.S. patent application Ser. No. 13/560,902, entitled "APPARATUS AND METHODS FOR GENERALIZED STATE-DEPENDENT LEARNING IN SPIKING NEURON NETWORKS", filed Jul. 27, 2012, the foregoing being incorporated herein by reference in its entirety.

It will be recognized by those skilled in the arts that that while certain aspects of the disclosure are illustrated via a classification implementations, the present innovation is not so limited. Spiking neuron network signal processing methodology of the disclosure comprising conditionally independent subsets may be employed in signal detection, data regression, and/or parameter estimation applications.

Implementation of Bayes classifiers with conditionally independent subsets (a spiking fern classifier) using spiking neuron networks may enable efficient computations due to ability to process data in parallel by such networks (e.g., the networks 100, 300, 440 of FIGS. 1A, 3, 4). Compared to other implementations, a spiking fern classifier may require fewer computational steps in order to learn and/or classify input feature sets. Parallel processing and/or fewer computational steps may reduce latency that may be associated with the classifier operation. That is, a spiking fern classifier may provide a more timely response upon receiving input data (e.g., characterized by a shorter delay between receipt of the input and provision of the output). Faster response may be advantageous in various applications such as, for example collision avoidance, serial image search, early warning military systems (e.g., classification of an incoming aircraft, missile, torpedo, and/or a mortar shell), navigation, and/or other tasks that may benefit from rapid searching for a target. The output of the fern classifiers may be encoded into spike rate, spikes, and/or messages so that the classifier may be utilized as a subsystem in different types of network realizations. The classifier of the disclosure may be configured to implement different types of learning rules (e.g., supervised and/or reinforcement), and online learning. In some implementations, the classifier of the disclosure may be configured implement semi-naive Bayesian regression.

It will be recognized that while certain aspects of the disclosure are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the invention. This description is in no way meant to be limiting, but rather should be taken as illustrative of the general principles of the invention. The scope of the disclosure should be determined with reference to the claims.

What is claimed:

1. A computer-implemented method for detecting an object in a digital image, the method being performed by one or more processors configured to execute computer program modules, the method comprising:
   receiving a spiking input comprising a vector of features representing the object;
   inverting the spiking input to produce an inverted spiking signal;
   selecting subsets of the vector of features including a first subset, the first subset including one or more of the vector of features;
   providing a portion of the spiking input and a portion of the inverted spiking signal to a first sub-classifier of a plurality of sub-classifiers, the portion of the spiking input and the portion of the inverted spiking signal being associated with the first subset, the first sub-classifier comprising a plurality of spiking neurons;
   based on the provided portion of the spiking input and the provided portion of the inverted spiking signal, providing a first sub-classification output by the first sub-classifier;
   combining outputs of individual ones of the plurality of sub-classifiers associated with respective ones of the subsets of the vector of features to provide a classification output, the classification output being configured to indicate a presence or an absence of the object in the digital image; and
   updating states of individual ones of the plurality of spiking neurons based on at least one feature present within the provided portion of the spiking input and the provided portion of the inverted spiking signal;
   wherein the first sub-classification output is provided based on the updated states.

2. The method of claim 1, wherein the first sub-classification output is characterized by one or more spikes generated by one or more neurons of the plurality of spiking neurons, the one or more spikes being configured to indicate the presence or the absence of the object in the first subset of the vector of features.

3. The method of claim 1, wherein:
   the combination of the outputs of the individual ones of the plurality of sub-classifiers is effectuated by an aggregation spiking neuron configured to receive individual ones of singular spikes of individual sub-classification outputs, an operation of the aggregation spiking neuron being adjustable based on the singular spikes of individual sub-classification outputs;
   a given singular spike is characterized by a sub-classifier latency configured based on a function of a probability of the object being present in a given subset of features; and
   the classification output comprises at least one output spike characterized by a latency configured to indicate the presence or the absence of the object in the digital image.

4. The method of claim 3, wherein the latency is configured based on the function of the probability of the presence of the object in the digital image.

5. The method of claim 4, wherein the function includes one or more of a logarithm function, an exponential function, or a temporal difference function.

6. The method of claim 3, wherein the function comprises a logarithm and the combination is effectuated by an addition of a plurality of values representing a plurality of probabilities of the object being present in the digital image.

7. The method of claim 1, wherein a given sub-classification output comprises a plurality of spikes characterized by a spike rate, the spike rate being configured to indicate a probability of the presence of the object in the digital image.

8. The method of claim 1, wherein:
   a given sub-classification output comprises one or more spikes; and
   a number of the one or more spikes are configured to encode a probability of the object being present in the digital image.

9. The method of claim 1, wherein individual ones of the subsets of the vector of features operate in parallel to contemporaneously produce outputs of individual ones of the plurality of sub-classifiers.

10. The method of claim 1, wherein:
    a number of features in the first subset is smaller than a number of the vector of features; and
    a number of the plurality of spiking neurons within individual ones of the plurality of sub-classifiers is at least twice the number of the vector of features in the first subset.

11. The method of claim 10, wherein the first subset comprises a first feature and a second feature, and the providing the portion of the spiking input and the portion of the inverted spiking signal comprises:
    providing a spiking input associated with the first feature and a spiking input associated with the second feature to a first neuron of the plurality of spiking neurons of the first sub-classifier;
    providing the spiking input associated with the first feature and an inverted spiking signal associated with the second feature to a second neuron of the plurality of spiking neurons of the first sub-classifier;
    providing an inverted spiking signal associated with the first feature and the spiking input associated with the second feature to a third neuron of the plurality of spiking neurons of the first sub-classifier; and
    providing the inverted spiking signal associated with the first feature and the inverted spiking signal associated with the second feature to a fourth neuron of the plurality of spiking neurons of the first sub-classifier.

12. A non-volatile computer-readable storage medium having instructions embodied thereon, the instructions being executable by a processor to train an object classifier spiking neuron network by at least:
    provide an input representing a vector of features characterizing an image, individual ones of the vector of features being capable of representing one or more aspects of an object;
    partition the vector of features into subsets, a given subset including one or more features;
    for the given subset:
       provide a portion of the input associated with the one or more features of the given subset to a given sub-classifier comprising spiking neurons;
       provide a training signal indicating a presence or an absence of the object in the image;
       based on the training signal and the portion of the input, adjust a state of individual ones of the spiking neurons;
       based on the adjusted state, generate an output by a singular neuron of the spiking neurons comprised by the given sub-classifier;
    combine outputs provided by individual sub-classifiers associated with the subsets to produce a classification signal, the classification signal being configured to indicate the presence or the absence of the object in the image; and provide a feedback signal to the individual ones of the spiking neurons, the feedback signal being configured based on the classification signal and the training signal, the feedback signal being configured to increase a probability of a match between another classification signal for another training signal;

wherein the feedback signal is configured based on a comparison between the classification signal and the training signal.

13. The non-volatile computer-readable storage medium of claim 12, wherein the feedback signal is configured based on a difference measure between the classification signal and the training signal.

14. A non-volatile computer-readable storage medium having instructions embodied thereon, the instructions being executable by a processor to perform a method for training an object classifier spiking neuron network, the method comprising:

providing an input representing a vector of features characterizing an image, individual ones of the vector of features being capable of representing one or more aspects of an object;

partitioning the vector of features into subsets, a given subset including one or more features;

for the given subset:
providing a portion of the input associated with the one or more features of the given subset to a given sub-classifier comprising spiking neurons;
providing a training signal indicating a presence or an absence of the object in the image;
based on the training signal and the portion of the input, adjusting a state of individual ones of the spiking neurons;
based on the adjusted state, generating an output by a singular neuron of the spiking neurons comprised by the given sub-classifier;
combining outputs provided by individual sub-classifiers associated with the subsets to produce a classification signal, the classification signal being configured to indicate the presence or the absence of the object in the image; and
providing a feedback signal to the individual ones of the spiking neurons, the feedback signal being configured based on the classification signal and the training signal, the feedback signal being configured to increase a probability of a match between another classification signal for another training signal;
wherein the input comprises a direct spike train and an inverted spike train, the inverted spike train being configured to be complementary to the direct spike train.

15. A non-volatile computer-readable storage medium having instructions embodied thereon, the instructions being executable by aprocessor to train an object classifier by at least:

provide an input representing a vector of features characterizing an image, individual ones of the vector of features being capable of representing one or more aspects of an object;

partition the vector of features into subsets, a given subset including one or more features;

for a given subset:
provide a portion of the input associated with the one or more features of the given subset to a given sub-classifier comprising spiking neurons;
provide a training signal indicating a presence or an absence of the object in the image;
based on the training signal and the portion of the input, adjust a state of individual ones of the spiking neurons;
based on the adjusted state, generate an output by a singular neuron of the spiking neurons comprised by the given sub-classifier;
combine outputs provided by individual sub-classifiers associated with the subsets to produce a classification signal, the classification signal being configured to indicate the presence or the absence of the object in the image; and
provide a feedback signal to the individual ones of the spiking neurons, the feedback signal being configured based on the classification signal and the training signal, the feedback signal being configured to increase a probability of a match between another classification signal for another training signal;
wherein the partitioning comprises random selection of a subset from the vector of features.

16. The non-volatile computer-readable storage medium of claim 15, wherein the vector of features comprises a plurality of binary features, individual ones of the plurality of binary features being characterized by an inclusion in one of two categories.

17. A spiking neuron network object classification apparatus configured to detect an object in sensory input comprising a plurality of features representative of the object, the apparatus comprising:

one or more processors configured to execute computer program modules, the computer program modules comprising:
an input layer module configured to provide an input layer comprising input spiking neurons, a given input spiking neuron being configured to provide a spiking input indicative of an individual feature of the plurality of features;
an inversion layer module configured to provide an inversion layer comprising inversion spiking neurons, a given inversion spiking neuron being configured to invert the spiking input of a respective input spiking neuron; and
a classification module configured to provide a classification block comprising:
an output neuron configured to produce an output characterizing a probability of a presence of the object in the sensory input;
sub-classifier neurons partitioned into sub-classifiers comprising two or more of the sub-classifier neurons; and
connections configured to couple individual ones of the sub-classifier neurons to the output neuron;
wherein:
individual ones of the two or more of the sub-classifier neurons are configured to receive a portion of the spiking input and a portion of the inverted spiking input, the portion of the s of the inverted spiking input being associated with a respective sub-set of the plurality of features; and
for a given sub-classifier, a singular active neuron of the two or more of the sub-classifier neurons is configured to generate a spiking output indicative of the probability of the object being present in the sensory input given the respective sub-set of the plurality of features;

wherein the spiking output is generated based on: (i) a state adjustment of the singular active neuron based on the portion of the spiking input and the portion of the inverted spiking input; and (ii) a training signal indicating the presence or an absence of the object in the sensory input.

18. The apparatus of claim 17, wherein the state adjustment is based on a ratio between (i) a number of sub-classifier outputs indicating the presence of the object in the sensory input, and (ii) a number of total sub-classifier outputs for a respective one of the sub-classifiers.

19. A computer-implemented method for detecting an object in a digital image, the method being performed by one or more processors configured to execute computer program modules, the method comprising:
  receiving a spiking input comprising a vector of features representing the object;
  inverting the spiking input to produce an inverted spiking signal;
  selecting subsets of the vector of features including a first subset, the first subset including one or more of the vector of features;
  providing a portion of the spiking input and a portion of the inverted spiking signal to a first sub-classifier of a plurality of sub-classifiers, the portion of the spiking input and the portion of the inverted spiking signal being associated with the first subset, the first sub-classifier comprising a plurality of spiking neurons;
  based on the provided portion of the spiking input and the provided portion of the inverted spiking signal, providing a first sub-classification output by the first sub-classifier; and
  combining outputs of individual ones of the plurality of sub-classifiers associated with respective ones of the subsets of the vector of features to provide a classification output, the classification output being configured to indicate a presence or an absence of the object in the digital image;
  wherein:
    the first sub-classification output is characterized by a singular spike provided by an individual one of the plurality of spiking neurons, the singular spike being configured to indicate the presence or the absence of the object in the first subset of the vector of features;
    the combining of the outputs of the individual ones of the plurality of sub-classifiers is effectuated by an aggregation spiking neuron configured to receive individual ones of the singular spike of individual sub-classification outputs, an operation of the aggregation spiking neuron being adjustable based on the singular spike of the individual sub-classification outputs;
    a given singular spike being characterized by a sub-classifier latency configured based on a function of a probability of the object being present in a given subset of features; and
    the classification output comprises at least one output spike characterized by a latency configured to indicate the presence or the absence of the object in the digital image.

20. A computer-implemented method for detecting an object in a digital image, the method being performed by one or more processors configured to execute computer program modules, the method comprising:
  receiving a spiking input comprising a vector of features representing the object;
  inverting the spiking input to produce an inverted spiking signal;
  selecting subsets of the vector of features including a first subset, the first subset including one or more of the vector of features;
  providing a portion of the spiking input and a portion of the inverted spiking signal to a first sub-classifier of a plurality of sub-classifiers, the portion of the spiking input and the portion of the inverted spiking signal being associated with the first subset, the first sub-classifier comprising a plurality of spiking neurons;
  based on the provided portion of the spiking input and the provided portion of the inverted spiking signal, providing a first sub-classification output by the first sub-classifier; and
  combining outputs of individual ones of the plurality of sub-classifiers associated with respective ones of the subsets of the vector of features to provide a classification output, the classification output being configured to indicate a presence or an absence of the object in the image;
  wherein:
    a number of features in the first subset is smaller than a number of the vector of features;
    a number of the plurality of spiking neurons within the individual ones of the plurality of sub-classifiers is at least twice the number of vector of features in the first subset;
    the first subset comprises a first feature and a second feature, and the providing the portion of the spiking input and the portion of the inverted spiking signal comprises:
      providing a spiking input associated with the first feature and a spiking input associated with the second feature to a first neuron of the plurality of spiking neurons of the first sub-classifier;
      providing the spiking input associated with the first feature and an inverted spiking signal associated with the second feature to a second neuron of the plurality of spiking neurons of the first sub-classifier;
      providing an inverted spiking signal associated with the first feature and the spiking input associated with the second feature to a third neuron of the plurality of spiking neurons of the first sub-classifier; and
      providing the inverted signal associated with the first feature and the inverted spiking signal associated with the second feature to a fourth neuron of the plurality of spiking neurons of the first sub-classifier.

* * * * *